United States Patent [19]
Gallant et al.

[11] Patent Number: 6,159,528
[45] Date of Patent: Dec. 12, 2000

[54] METHODS FOR THE PROCESSING OF UNDERUTILIZED HARD-SHELLED CRUSTACEANS

[76] Inventors: Cyril G. Gallant, RR #2, Souris, Prince Edward Island, Canada, C0A 2B0; Lily Hong, 148 Maypoint Road, Apt. 11, Charlottetown, Prince Edward Island, Canada, C1E 1V1; Richard Ablett, Suffolk, RR #3, Charlottetown, Prince Edward Island, Canada, C1A 7J7

[21] Appl. No.: 09/437,319

[22] Filed: Nov. 10, 1999

Related U.S. Application Data

[63] Continuation-in-part of application No. 09/354,585, Jul. 16, 1999.

[30] Foreign Application Priority Data

| Jul. 20, 1998 | [CA] | Canada | 2240079 |
| Jul. 16, 1999 | [CA] | Canada | 2277611 |
| Sep. 24, 1999 | [CA] | Canada | 2283524 |

[51] Int. Cl.[7] ............................................. A22C 29/00
[52] U.S. Cl. ......................... 426/643; 452/8; 452/108; 452/109
[58] Field of Search ........................... 426/643; 542/8, 542/108, 109

[56] References Cited

U.S. PATENT DOCUMENTS

| 2,155,308 | 4/1939 | Harris | 99/188 |
| 2,501,655 | 3/1950 | Altenburg | 99/195 |
| 2,601,867 | 7/1952 | Alyea . | |
| 2,858,223 | 10/1958 | Harris | 426/479 |
| 2,858,563 | 11/1958 | Rodriguez . | |
| 2,978,334 | 4/1961 | Lapeyre | 426/479 |
| 3,022,175 | 2/1962 | Wakefield . | |
| 3,156,949 | 11/1964 | Moncure . | |
| 3,159,992 | 12/1964 | Helliwell . | |
| 3,253,299 | 5/1966 | Harris . | |
| 3,261,693 | 7/1966 | Jung . | |
| 3,513,071 | 5/1970 | Zehmerling | 195/2 |
| 3,705,040 | 12/1972 | Bynagte | 99/111 |
| 3,773,962 | 11/1973 | Trelease | 99/175 |
| 3,852,505 | 12/1974 | Rubin . | |
| 4,053,964 | 10/1977 | Rutledge | 17/48 |
| 4,092,435 | 5/1978 | Teijeiro . | |
| 4,124,920 | 11/1978 | Wenstrom et al. . | |
| 4,316,306 | 2/1982 | Huebotter . | |
| 4,336,274 | 6/1982 | Ross et al. . | |
| 4,340,613 | 7/1982 | Moore . | |
| 4,535,507 | 8/1985 | Reinke . | |
| 4,588,601 | 5/1986 | Maruyama | 426/574 |
| 4,816,278 | 3/1989 | Sasamoto | 426/513 |

(List continued on next page.)

FOREIGN PATENT DOCUMENTS 46-10898  3/1971  Switzerland .

*Primary Examiner*—Carolyn Paden
*Attorney, Agent, or Firm*—Nath & Associates PLLC; Gary M. Nath

[57] ABSTRACT

Methods are provided for separating the intact shell of hard-shelled crustaceans of any species from the raw edible meat contained therein which is very strongly attached to the shells. The methods each include the first step of initiating the detachment of the raw edible meat from the intact shell by the step of subjecting the intact shell to at least one freeze-thaw cycle, where the thawing is carried out in cold water or cold brine to minimize deterioration of the flavour of the crustacean meat. Then the intact shell is separated from the raw edible meat by several different alternative steps. One alternative step includes subjecting the so-treated intact shell to vacuum aspiration to separate the intact shell from the raw edible crustacean meat, so as to recover the raw edible crustacean meat. These methods may also be used for the recovery of raw edible intact crustacean meat, from easy-to-process clawed lobsters of the Homaridae family, easy-to-process crab, e.g., Snow crab, Maryland Blue crab, Alaska King crab, Dungeness crab, and to lobster-like crustaceans, including some types of prawn, *Nephrops norwegicus* and freshwater crayfish species. The method is particularly adapted to the processing of hard-to-process clawless Spiny lobster and Rock lobster species of temperate and tropical origin, species of the genera Panulirus, Jasus and Chelonectes.

19 Claims, 11 Drawing Sheets

U.S. PATENT DOCUMENTS

| | | | |
|---|---|---|---|
| 4,820,529 | 4/1989 | Uchida | 426/7 |
| 4,959,957 | 10/1990 | Schmale et al. | |
| 5,013,230 | 5/1991 | Ikeuchi et al. | |
| 5,542,877 | 8/1996 | Taylor | |
| 5,560,954 | 10/1996 | Elbaz | 426/589 |
| 5,846,586 | 12/1998 | Sawyer | |

STEP (3)

STEP (4)

STEP (5)

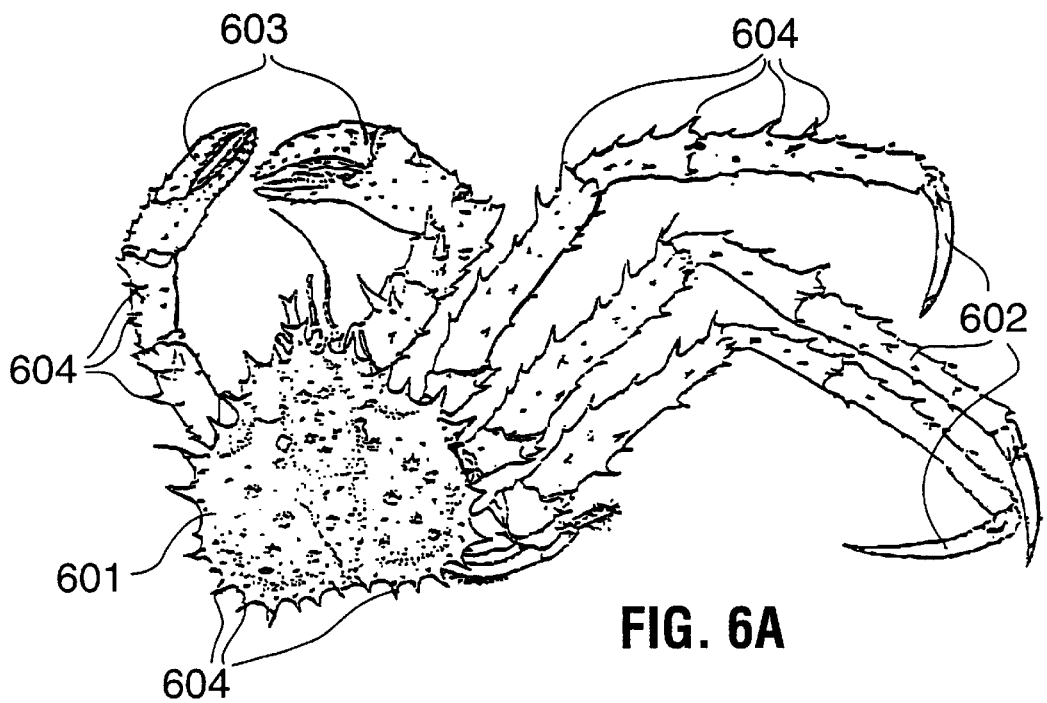
FIG. 6A
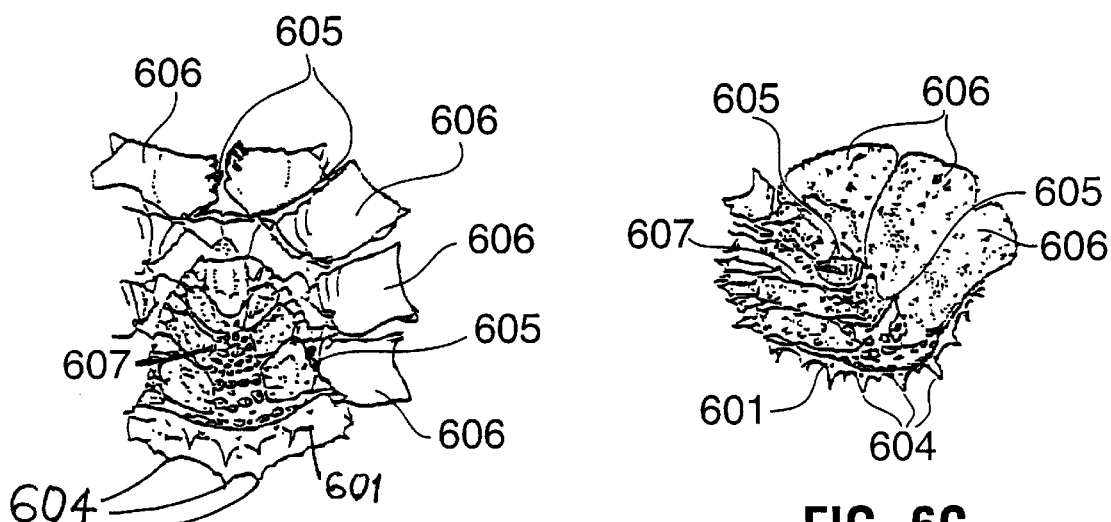
FIG. 6B
FIG. 6C
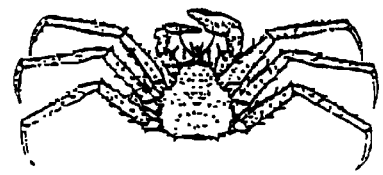
FIG. 6D

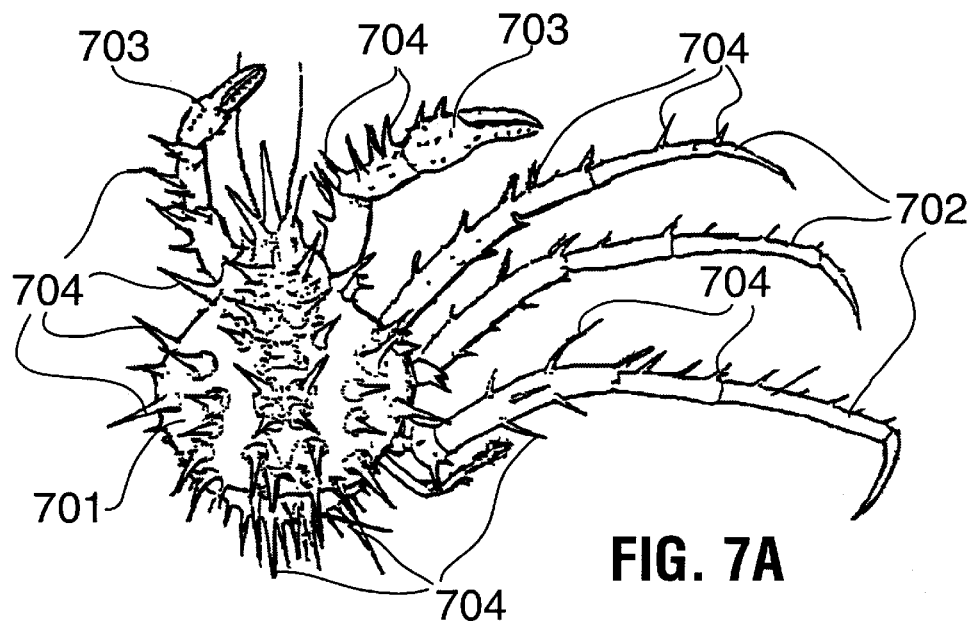
FIG. 7A
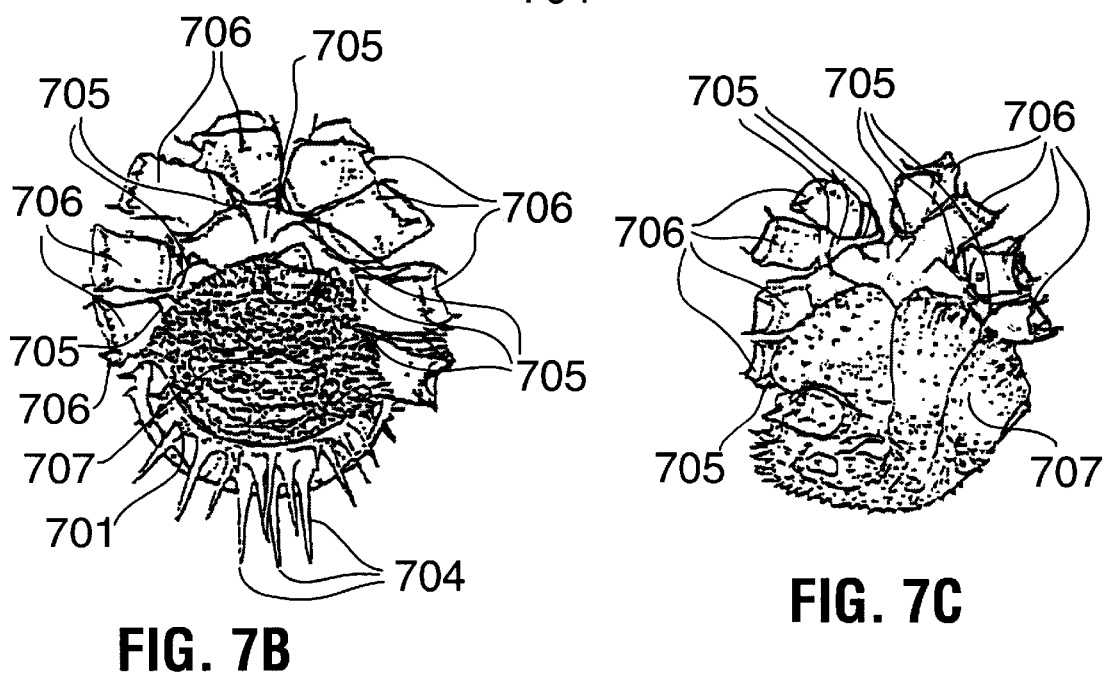
FIG. 7B
FIG. 7C
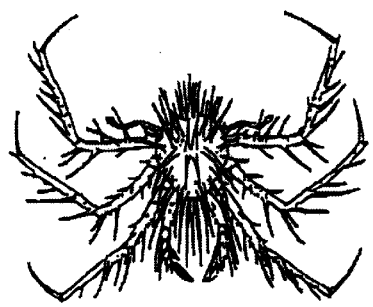
FIG. 7D

METHODS FOR THE PROCESSING OF UNDERUTILIZED HARD-SHELLED CRUSTACEANS

RELATED INVENTIONS

This application is a continuation-in-part of Copending application Ser. No. 09/354,585 filed Jul. 16, 1999, the entire contents of which are incorporated herein by reference.

BACKGROUND OF THE INVENTION (1) Field of the Invention

The present invention relates to a method for optimizing the utilization of hard-shelled crustaceans, e.g., lobsters and crabs, through inclusion of under-utilized by-product components. These methods are also applicable to the processing of easy-to-process clawed lobsters of the Homaridae family, and to easy-to-process crab, e.g., Snow crab, Maryland Blue crab, Alaska King crab, Dungeness crab, Irish crab (*Cancer pagurus*) and Jonah crab (*Cancer borealis*) and including species of the genera Panulirus, Jasus and Chelonectes and to lobster-like crustaceans, including some types of prawn, *Nephrops norwegicus* and freshwater crayfish species. These methods are particularly applicable to the processing of hard-to-process clawless Spiny lobster and Rock lobster species of temperate and tropical origin, as well as to the processing of hard-to-process Northern Stone Crab (*Lithodes maja*), Porcupine Crab (*Neolithodes grimaldii*), and Green Crab.

(2) Description of the Prior Art

A traditional method for processing and packaging easy-to-process clawed lobsters of the Homaridae family consisted of cooking them whole, either by steam exposure or by hot water immersion, cooling the product and sealing them in plastic bags containing brine solution with subsequent freezing to render the lobster embedded in ice. Inherent to this traditional lobster frozen-in-brine product, a substantial degree of visceral staining of the edible meat components within the upper tail region was encountered. This was attributed, in part, to migration and rupture of the visceral hepatopancreatic fraction and intestinal tract contents during the preparative cooking procedure. Also inherent to this product were residual heavy-metal contaminants, which were predominately-located in the visceral fraction and which underwent migration to the edible body meat fraction as a result of cooking procedures.

Other traditional methods of processing intact lobsters consisted of freezing cooked lobsters, which were wrapped individually in wax paper in a master-box. Another common method involved the removal of the intact tail section of lobsters with subsequent individual quick-freezing, and packaging the tails through alignment into a box. In such products, the raw lobster material either in an intact form, or as tail sections was prone to problems of breakage due to the brittle nature of their shell material. Particularly, such problems were encountered during distribution and transportation procedures.

The extraction of meat from the body of hard-shelled crustaceans in which the meat is very strongly attached to the shell, e.g., all species of crab, crayfish, lobster, and rock shrimp, as opposed to soft-shelled crustaceans, e.g., all shrimp species, other than rock shrimp, has proved to be very difficult, time consuming and expensive. In present day practices, for obtaining the edible portions from such crustaceans, e.g., all species of lobster, crab, crayfish, rock shrimp, and the like, involved a variety of mechanical, electrical and heat-treatments which included subjecting the crustaceans to a sawing action on the shells, a high or low electrical voltage through the shells, treatment with direct flame, immersion in boiling water or various chemical treatments, or treatment with steam at atmospheric pressure or under high pressures in closed vessels. A myriad of other procedures were also known which involved combinations of some or all of the foregoing methods. While some of the procedures had various degrees of success, most of the prior known procedures required hand labour to treat the individual fresh crustaceans in order to remove the edible flesh.

Both raw and cooked hard-shell sections of processed lobsters have heretofore been subjected to many treating methods, for example, freezing intact for subsequent transformation by boiling for rendering extraction of flavour, or proteinaceous solubles and non-soluble components for further culinary applications. In addition, the head-shell material of either raw or cooked lobster was subjected to grinding reduction and mechanical meat removal procedures.

It was virtually impossible to remove raw lobster meat from head shell without grinding the head shell. Consequently, various mechanical methods have been developed to remove either raw or cooked meat from mechanically-reduced head-shell material. In some techniques, physical separation of the meat from the shell was effected through the use of riffle tank particle separation methods. The broken-up shell effectively settled to the bottom, and the extracted meat was concentrated by water fluming and screen collection. A recognized impediment to this procedure was the loss of desirable and delicate flavour components attributed to the extensive washing procedures during separation.

In other traditional procedures, the cooked head-shells of lobster resulting from hand-shucking processing procedures were subjected to mechanical grinding and reduction through use of perforated rotating drum technology. In this method, the edible meat, and visceral components contained within the head-shell component were separated from the shell fraction by the application of variable belt pressure against a perforated stainless steel drum. The size of the apertures in the drum provided for physical separation of the softer meat and visceral components from the hard brittle shell and cartilaginous skeletal material. Such products arising were commonly recognized as "lobster mince" and found use as culinary ingredients within the food industry.

Many of the difficulties in the removal of the crustacean meat stemmed from the physical structure of the hard crustacean shell, the manner in which the meat was adhered to the shell, the need to extract and maintain the meat in a minimum bacteriologically-contaminated manner, as well as the commercial desire to extract the meat in lump form rather than in many small pieces. The research, both by industry and universities, has been extensive and has resulted in various alleged improvements in the meat extraction processes.

Pre-treatment of the crustaceans by chemicals, the use of certain cooking conditions, the use of machines which squeezed the meat out, or which cored and centrifuged the meat out, or in which air or water blasted the meat out, or which froze and exploded the meat out, have been proposed and advanced with varying degrees of success.

Lobster, and limbs and claws thereof, have been efficiently used and formulated into limb-like or stick-like meat products or claw meat products. After removing the carapaces, gonads, branchiae and internals, the trunks were washed with water and ground-up. Then, the meat remaining in the trunks was recovered with a meat separator and was formulated into minced meat. This meat was further washed with water and the fibrous meat was taken therefrom and was formulated into flakes. Thus, various proteineous parts, including meat remaining in the carapace, the glands, branchiae and meat remaining in the trunks were not utilized, but was disposed of as such.

In the current art and industry of producing meat from the various species of crab it is now common practice to prepare the cooked crab body for removal of the meat by processing the body through a machine which removes the claws, flippers, walking legs and carapace, and then brushes and flushes the visceral cavity. Further machine processing of the prepared body could successfully produce marketable regular mat, but could not remove the backfin lump meat which was considered to be the most valuable product of the crab and which, to date, must be removed by hand picking. An improvement to that processing procedure involved preparing the crab for removal of the lump meat after cooking and removing of the carapace. That procedure involved cutting the side mounds of the body along planes which were disposed at equal acute angles to the bottom shell of the crab and converged to meet along the intersection of the bottom shell and the middle bony ridge, and were outside the inner walls of the collar bones. This exposed the two lump meats, after which a hand tool was inserted into each lump cavity on either side of the lump, and was then compressed and withdrawn, bringing the lump meat with it.

There are many patents which are directed to the processing of such shellfish. Non-limiting examples include the following patents.

U.S. Pat. No. 2,155,308, patented Apr. 18, 1939, by Sterling G. Harris and assigned to The Blue Channel Corporation, provided a procedure for canning crabs, which involved a relatively moderate preliminary heat-treatment in an aqueous fluid, to weaken the tissues by which the portions comprising the carapace, gills and loosely adhering body tissues of the body cavity are attached to the crab, and to remove such portions prior to complete cooking.

U.S. Pat. No. 2,501,655, patented Mar. 28, 1950, by W. M. Altenburg, disclosed a method for loosening lobster meat from its shell by searing the surface of the lobster meat adjacent to the shell, without cooking the interior meat, and subsequently cooling and rapidly freezing the whole lobster.

U.S. Pat. No. 2,858,223, patented Oct. 28, 1958, by Sterling G. Harris, and assigned to The Blue Channel Corporation, provided a method for separating meat from crustacean shells by cooking the meat to shrink it from the shell, then impacting the shell to release the meat, screening the material and then subjecting the screened shell and meat to a flotation separation procedure.

U.S. Pat. No. 2,978,334, patented Apr. 4, 1961, by Lapeyre, and assigned to The Peelers Company, described a general procedure for extracting edible portions of crustaceans, e.g., lobsters, crabs, etc., from the skeletal portions thereof. This included the sequence of freezing and then suddenly lowering the pressure on the outside of the crustacean relative to the internal pressure to explode the shell of the crustacean.

U.S. Pat. No. 3,022,175, patented Feb. 20, 1962 by L. A. Wakefield provided a procedure for the preparation of King Crab legs by severing the legs from the crab body, by cutting the joint or by being manually broken away. The shell was then broken and the legs were removed from the broken shell. The shelled crab legs were then frozen.

U.S. Pat. No. 3,159,992, patented Jun. 9, 1964, by L. C. Fredrickson, provided a method for shelling a crab by first bisecting the shell at the bulb portion of the crab claw between the dactyl and pollex of the claw. The shell segment, including the meat of the bulb portion, was then separated from the shell segment which was integral with the dactyl. The shell segment was then separated from the pollex by bending backwardly to break the skin-like hinge.

U.S. Pat. No. 3,156,949, patented Nov. 17, 1964, by J. P. Moncure, provided methods for processing crabs. The claws, legs, and fins were first broken off. Then, the muscles of the thorax were exposed. In a further procedure, the knuckles and portions of the thorax walls were trimmed away. In a still further procedure, the knuckles were cut away to enable removal of the meat from within the thorax. In yet another procedure, the processing included the steps of breaking off the claws, legs and fins, whereby the crab was reduced to the carapace and thorax and knuckles thereof, grasping the thorax at the lateral sides thereof and removing the carapace and internal organs of the crab, and grasping the thorax by its forward and rear sides and trimming and severing the knuckles and portions of the lateral sides of the thorax. In this way the meat from within the thorax may be removed.

U.S. Pat. No. 3,253,299, patented May 31, 1966, by S. G. Harris, assigned to The Blue Channel Corporation, provided a procedure including breaking off the claws or the legs from the crab by repeatedly striking them in a direction which was transverse to the axis of the body.

U.S. Pat. No. 3,471,894, patented Oct. 14, 1965 by E. W. Tasker, assigned to Cape Ann Marine Research Company Inc., provided a procedure for deshelling crustaceans by placing the crustaceans in a fluid atmosphere, e.g., steam, water or alcohol, and then first subjecting the crustaceans to a first high pressure, and then subjecting them to a rapid decompression step to detach the shells from the flesh.

U.S. Pat. No. 3,513,071 patented May 19, 1970, by Gottlieb Bernhard Fehmerling, provided a method for loosening and then removing edible tissue from the shells of crustaceans, e.g., lobsters, crabs, etc. This included the use of a synergistic combination of enzymes that attacked the connective tissue which held the edible flesh to the shell. The crustaceans were then removed from the enzyme solution bath and were sprayed to remove the edible tissue from the shells.

Japanese Patent No. 46-10898, described a method wherein lobsters, which were in a vacuum chamber and were subjected to vacuum chamber conditions, were exposed to protease enzymes in a temperature range of 50° C. to 55° C. By first vacuum eviscerating the crustaceans with subsequent release of vacuum and injection of steam, the raw meat attached to the shell of the lobster was said to be more effectively separated and could be manually-removed.

U.S. Pat. No. 3,705,040, patented Dec. 5, 1972, by Peter W. Bynagte, and assigned to Westgate-California Foods, Inc., provided a procedure for extracting meat from crustaceans by dipping them in a particular pyrophosphate or metaphosphate solution. The crustaceans were then cooked, and the cooked crustaceans after such procedure were said to be more easily peeled.

U.S. Pat. No. 3,773,962, patented Nov. 20, 1973, by Trelease et al, and assigned to A. Swift & Company, disclosed a method which included cleaning of the stomach and hind-gut of lobster by the use of vacuum evisceration to remove the contents of the stomach and visceral cavity prior to cooking and freezing.

U.S. Pat. No. 4,053,964, patented Oct. 18, 1977, by J. E. Rutledge, provided a procedure for preparing hard-shelled crustaceans for extraction of their body meat from their shells. The first step involved freezing crustaceans either by conventional "quick freezing" techniques or by merely placing the crustaceans in a standard freezer compartment. The next step involved thawing the crustaceans. This thawing was accomplished by simply leaving the crustaceans out at room temperature. The next step involved treating the uncooked crustacean meat in the shell by any of the "conventional" meat extraction procedure. Examples of some "conventional" meat extraction processes included the following. In one extraction procedure, the crustacean had its back shell and leg appendages removed, the remaining shell split into two halves, the internals and fat remove by brushing and washing and finally the cleaned halves passed between two rollers which squeezed the meat out from the shell. In another extraction procedure, the crustacean body was cored and the core placed on conventional centrifuge device to spin the meat out of the core. Another procedure to extract the meat was to use air or water to blow the meat from the crustacean shell after the back and leg appendages had been removed. In yet another method, the crustacean meat could be extracted from the shell by hand.

U.S. Pat. No. 4,340,613, patented Jul. 20, 1982, by Michael P. Moore, described a method for cooking shellfish, e.g., crabs, lobsters, shrimp, and other crustaceans having skeletal portions from which the edible portions are removed prior to consumption. The method included at least partially cooking the shellfish with steam. Then moisture was withdrawn from the at least partially cooked shellfish by subjecting the shellfish to a vacuum at a rate which caused no disruption to the structure of the skeletal portions. This cooking was followed by subjecting the shellfish to vacuum which was said to facilitate mechanical removal of the edible portions from the exoskeleton and/or skeleton portions thereof. Shellfish, e.g., crabs, shrimp, and lobster which were steam-cooked prior to removal of the skeletal portions either by hand or by mechanical means invariably were difficult to separate from the skeletal portions due to the tendency of the edible portion thereof to adhere to the skeletal portions. In particular, mechanical removal techniques employing vacuum-induced meat removal forces were often relatively ineffective when processing shellfish which had been cooked by prior art methods due to the adherence of the edible portions of the cooked shellfish to the skeletal portions and the non-contactive nature of such vacuum removal techniques. The patentee suggested that his method caused the edible portions of the shellfish to shrink to a degree which reduced adherence thereof to the skeletal portions, thereby enabling more rapid and facile removal of said edible portions, especially when vacuum removal techniques were employed.

Other patents taught the production of seafood pastes. Non-limiting examples include the following:

U.S. Pat. No. 4,588,601, patented May 13, 1986, by T. Maruyama et al, and assigned to Kibun Company Limited, provided a method of producing a paste-product, from, e.g., various fish to provide pseudo lobster meat. This included dividing a finepaste product, which had already been coagulated by heating, mixing the divided product with a protein mixture and then moulding the resulting mixture. The mixing and/or moulding procedure was carried out under reduced pressure and then the moulded product was heated.

U.S. Pat. No. 4,816,278, patented Mar. 28, 1989, by Sasamoto et al, and assigned to The Japanese Research and Development Association for Extrusion Cooking, Nippon Suisan Kabushiki Kaisha, Taiyo Fishery Co. Ltd., Kabushiki Kaisha Kobe Seikosho, Ajikan Col Ltd., and Kougyo Co. Ltd., provided a method for processing and treating raw crustaceans, e.g., lobsters, mollusks and seaweed mixtures. This material was mixed together and an optional additive, e.g., soyprotein, wheat flour or starch, was added to the mixture by means of a twin-screw extruder.

U.S. Pat. No. 4,820,529, patented Apr. 11, 1989, by Y. Uchida et al, and assigned to Asahi Denka Kogyo Kabushiki Kaisha, provided a procedure for efficiently-utilizing the meat of crustaceans, e.g., lobster, or crab. This involved utilizing the meat remaining in the trunks and carapaces, by boiling and milling the crustaceans under sufficient conditions for inactivating the enzymes contained therein. Then, added proteolytic enzymes and/or microorganisms were allowed to act thereon.

U.S. Pat. No. 5,560,954, issued Oct. 1, 1996, to Gabriel Elbaz, described a method for preparing a culinary base product from the head-shell of lobster and other crustacean species. This involved a combination of oven heating the intact head-shell material, then subjecting it to mechanical-size-reduction with subsequent emulsification and addition of thickening agents for product stabilization. For the final product, this method provided for the use of both the carapace shell and the soft tissue components.

Thus, none of these conventional methods provided a procedure for separating intact crustacean shell from intact whole raw crustacean meat in order to use by-products and inefficiently-utilized components of crustaceans, and to process hard-to-process crustaceans to provide intact raw crustacean meat while also overcoming the limitations of the prior art.

SUMMARY OF THE INVENTION (a) Aims of the Invention

One object of the present invention is to provide a novel processing procedure of crustaceans, which maximizes the use of formerly-unutilized body parts thereof.

A second object of this invention is to provide a procedure which includes a technique which facilitates the loosening and the removal of the edible, intact raw meat from intact shells of crustaceans.

A third object of this invention is to provide a procedure which includes a technique for separating intact raw meat from hard-shelled crustaceans, particularly various species of lobster and crab.

A fourth object of this invention is to provide a procedure for separating intact shells of such crustaceans, from intact raw meat, that has a shorter processing time, is more economical.

A fifth object of this invention is to provide a procedure for producing a stuffing paste product from crustacean roe and crustacean meat.

(b) Statements of Invention

This invention, in a first broad aspect, provides a method for removing raw edible meat from the intact shell of hard-shelled crustacean of any species in which the meat is very firmly adhered to the shell, the method comprising: a) initiating the detachment of the raw edible meat from the intact shell by the step of subjecting the intact shell to at least one freeze-thaw cycle wherein the thawing is accomplished in cold water, or in a cold dilute solution of brine; and b) recovering the raw edible meat by the step of either: (i) subjecting the so-treated intact shell to vacuum aspiration to remove and recover the raw edible intact whole meat; or (ii) manually separating the intact shell from intact raw whole edible meat, and recovering the intact raw whole edible meat while discarding the shell.

This invention, in a second broad aspect, provides a method for preparing stuffed, intact, whole, lobster of any species, which comprises vacuum eviscerating the anterior and posterior sections of the lobster; back-flushing the anterior and posterior sections of the lobster for the removal of the visceral and intestinal contents of the lobster; and filling the anterior visceral cavity of the lobster with a stuffing comprising a raw blend comprising roe of lobster of any species and meat of lobster of any species, preferably, such lobster meat which has been recovered by the methods as described herein, thereby providing stuffed, intact, whole, lobster.

This invention, in a third broad aspect, provides a stuffed, intact, whole lobster of any species in which the visceral and intestinal contents of the lobster have been removed, the lobster being filled with a stuffing comprising a raw blend comprising roe of lobster of any species and the meat of lobster of any species, preferably such lobster meat which has been recovered by the methods as described herein.

This invention, in a fourth broad aspect, provides a stuffing for a stuffed, intact, whole lobster of any species in which the visceral and intestinal contents of the lobster have been removed, the stuffing comprising a raw blend comprising roe of lobster of any species and meat of lobster of any species, preferably such lobster meat which has been recovered by the methods as described herein.

This invention, in a fourth broad aspect, provides a method for preparing stuffed, intact, whole, crab of any species, which comprises: vacuum eviscerating the visceral cavity of the crab through the spot between the cap and the carapace of the crab; backflushing the visceral cavity of the crab for the removal of the visceral and intestinal contents of the crab; and filling the visceral cavity of the crab with a stuffing comprising a raw blend comprising roe of crab of any species and the meat of crab of any species, preferably such crab meat having been recovered by the methods as described herein; thereby providing stuffed, intact, whole, crab.

This invention, in a fifth broad aspect, provides a stuffed, intact, whole, crab of any species in which the visceral and intestinal contents of the crab have been removed, the crab being filled with a stuffing comprising a raw blend comprising roe of crab of any species and meat of crab of any species, preferably such meat having been recovered by the methods as described herein.

This invention, in a sixth aspect, provides a stuffing for a stuffed, intact, whole crab of any species in which the visceral and intestinal contents of the crab have been removed, the stuffing comprising a raw blend comprising roe of crab of any species and meat of crab of any species, preferably such meat having been recovered by the method as described herein.

(c) Other Features of the Invention

By a first broad species of the first broad generic aspect of the invention, the method is used for removing meat from the head-shell of Homaridae lobster, and comprises: a) initiating the detachment of the raw edible deep-shoulder myotomal meat of the Homaridae lobster from the deep-shoulder cartilaginous skeletal attachment by the step of subjecting the head-shell to at least one freeze-thaw cycle wherein the thawing is accomplished with cold water, or with a cold dilute solution of brine; and b) subjecting the so-treated head-shell to vacuum aspiration to remove and recover the raw intact meat fraction.

By a first feature of this first broad species of the first broad generic aspect of this invention, the head-shell is subjected to a freezing procedure at a temperature of ranging from about −10° C. to about −20° C., followed by thawing of the frozen head-shell until a temperature of about 4° C. to about 12° C. is reached.

By a second feature of this first broad species of the first broad generic aspect of this invention, and/or the above feature thereof, the thawing step is accomplished in cold water or in cold brine in the temperature range of about 1° C. to about 10° C. for a period of time of between about 1 minute to about 10 minutes. By a first feature of that feature, the step of thawing is accomplished in cold water or in cold brine for a period of time of between about 3 minutes to about 8 minutes.

By a third feature of this first broad species of the first broad generic aspect of this invention, and/or the above features thereof, the step of vacuum aspiration of the so-treated deep-shoulder section lobster meat fraction is achieved under about 15 inches of Hg. to about 25 inches of Hg.

By a second broad species of the first broad generic aspect of the invention, the method is used for removing meat from Spiny lobster, and comprises: a) initiating the detachment of an intact shell of the Spiny lobster from intact raw edible meat by the step of subjecting the Spiny lobster to at least one freeze-thaw cycle wherein the thawing is accomplished in cold water, or in a cold dilute solution of brine; and b) manually separating intact shell of the Spiny lobster from whole, intact Spiny lobster meat within the shell, and recovering the whole, intact Spiny lobster meat, while discarding the shell.

By a first feature of this second broad species of the first broad generic aspect of this invention, the method includes the step of butchering anaesthetized Spiny lobster by separating its body from its carapace. By a first feature of that feature, the anaesthetizing is accomplished with a dilute aqueous solution of a metabisulphite. By a second feature of that feature, the carapace is subjected to a freezing procedure at a temperature of ranging from about −10° C. to about −20° C., followed by thawing of the carapace until a temperature of about 4° C. to about 12° C. is reached.

By a second feature of this second broad species of the first broad generic aspect of this invention, and/or the above feature thereof, the thawing step is accomplished in cold water or in cold dilute brine for a period of time of between about 1 minute to about 10 minutes. By one feature of that feature, the thawing step is accomplished in cold water or in cold dilute brine for a period of time of between about 3 minutes to about 8 minutes.

By a third feature of this second broad species of the first broad generic aspect of this invention, and/or the above features thereof, the method includes the step of removing the antennae with the head shell and the meat therein still attached to the antennae from the carapace. By a first feature of that feature, the method includes the steps of recovering intact whole antennae meat by manually breaking the shell and the knuckles of the antennae; manually separating the broken shell from intact antennae meat; and recovering the intact antennae meat, while discarding the shell.

By a fourth feature of this second broad species of the first broad generic aspect of this invention, and/or the above features thereof, the method includes subjecting the body to a freezing procedure at a temperature ranging from about −10° C. to about −20° C., followed by thawing of the body wherein the thawing is accomplished in cold water, or in a cold dilute solution of brine until a temperature of about 4° C. to about 12° C. is reached. By a first feature of that feature thereof, the thawing step is accomplished in cold water or in cold dilute brine for a period of time of between about 1 minute to about 10 minutes. By a second feature of that feature, the thawing step is accomplished in cold water or in cold dilute brine for a period of time of between about 3 minutes to about 8 minutes.

By a fifth feature of this second broad species of the first broad generic aspect of this invention, and/or the above features thereof, the method includes the step of recovering intact, whole head shell meat by separating intact head shell from intact head shell meat; and recovering the intact head shell meat, while discarding the head shell.

By a sixth feature of this second broad species of the first broad generic aspect of this invention, and/or the above features thereof, the method includes the steps of recovering intact leg meat by severing the legs from the body at the shoulder; severing the tendon of the legs at the first joint of the legs; grasping the shell of the leg at the extremity of the leg and at the shoulder end of the leg with different hands; pulling the shells apart, thereby exposing the intact leg meat adjacent to the extremity of the leg, and discarding that leg shell; grasping the exposed leg meat and the shell at the shoulder end of the leg with different hands; pulling the leg meat and the leg shell apart, thereby exposing the entire whole intact leg, and discarding the shell; and recovering the entire whole intact leg meat.

By a seventh feature of this second broad species of the first broad generic aspect of this invention, and/or the above features thereof, the method includes the steps of recovering intact shoulder meat by manually breaking the thorax shell at the shoulders of the legs into segments; manually separating each broken thorax shoulder shell segment from the intact shoulder shell meat, and discarding the separated shell segments; manually breaking up the thorax shell segments; manually separating the broken-up thorax shell segments from the intact thorax meat and discarding the broken thorax shell segments; and recovering intact, whole thorax meat.

By a third broad species of the first broad generic aspect of this invention, the method is used for removing meat from crab, and comprises: a) initiating the detachment of an intact shell of the crab from intact raw edible meat by the step of subjecting the crab to at least one freeze-thaw cycle wherein the thawing is accomplished in cold water, or in a cold dilute solution of brine; and b) manually separating intact shell of the crab from whole, intact crab meat within the shell, and recovering the whole, intact meat, while discarding the shell.

By four features of this third broad species of the first broad generic aspect of this invention, the crab is *Lithodes maja*, or the crab is *Neolithodes grimaldii*, or the crab is Cancer pagurus, or the crab is *Cancer borealis*.

By a fifth feature of this third broad species of the first broad generic aspect of this invention, the method includes the step of butchering the crab by removal of the cap. By a first feature of that feature, the capless crab is subjected to a freezing procedure at a temperature of ranging from about −10° C. to about −20° C., followed by thawing of the frozen capless crab, wherein the thawing is accomplished in cold water, or in a cold dilute solution of brine until a temperature of about 4° C. to about 12° C. is reached.

By a sixth feature of this third broad species of the first broad generic aspect of this invention, and/or the above features thereof, the thawing step is accomplished in cold water or in cold brine in the temperature range of about 1° C. to about 10° C. for a period of time of between about 1 minute to about 10 minutes. By a first feature of that feature, the thawing step is accomplished in cold water or in cold brine for a period of time of between about 3 minutes to about 8 minutes.

By a seventh feature of this third broad species of the first broad generic aspect of this invention, and/or the above features thereof, the steps of recovering intact crab leg meat includes severing the legs from the body of the crab at the shoulder; severing the tendon of the legs at the first joint of the legs; grasping the shell at the leg at the extremity of the leg and at the shell of the shoulder end of the leg with different hands; pulling the shells apart, thereby exposing the intact crab leg meat adjacent to the extremity of the leg, and discarding that leg shell; grasping the exposed crab leg meat and the shell at the shoulder end of the leg with different hands; pulling the crab leg meat and the leg shell apart, thereby exposing the entire whole intact crab leg, and discarding the shell; and recovering the entire whole, intact crab leg meat.

By an eighth feature of this third broad species of the first broad generic aspect of this invention, and/or the above features thereof, the method includes the steps of recovering intact whole thorax shoulder meat by manually breaking the thorax shell at the shoulders of the legs into shell segments; manually separating the broken thorax shoulder shell segments from the intact shoulder shell meat, and discarding the separated shell segments; manually breaking up the thorax shell into shell segments; manually separating the broken-up thorax shell segments from the intact thorax meat and discarding the broken thorax shell segments; and recovering intact, whole thorax meat.

By a first feature of the second broad aspect of this invention, the vacuum aspiration of the anterior visceral cavity and the posterior intestinal tract is accompanied by back-flushing with a dilute aqueous solution of lactic acid, thereby to confer bacteriostatic properties to the eviscerated lobster. By a first feature of that feature, the lactic acid is used in a concentration range of about 5 to about 20 ml/L (w/w).

By two different features thereof, the lobster is Homaridae lobster, or the lobster is Spiny lobster.

By a fourth feature of this second broad aspect of this invention, the method includes the step of freezing the stuffed, intact, whole, lobster.

By a fifth feature of this second broad aspect of this invention, the method includes the step of cooking the stuffed, intact, whole, lobster at about 100° C. for a sufficient time to achieve internal carapace temperature of at least about 75° C., followed by subsequent rapid cooling to effect rapid temperature removal, and finally freezing the stuffed, intact, whole, lobster. By a first feature of that feature, the cooking of the stuffed, intact, whole, lobster is by steam-cooking. By a second feature of that feature, the cooling of the cooked stuffed, intact, whole, lobster is by spray irrigation.

By a sixth feature of this second broad aspect of this invention, and/or the above features thereof, the raw stuffing blend comprising the lobster roe and the lobster meat is introduced into an anterior visceral cavity of a previously-eviscerated lobster by oral intubation and subsequent vibration to effect removal of residual air, thereby to achieve effective filling of the anterior visceral cavity and effecting integuous contact between the raw stuffing blend and the contour of the inner shell surface and region of abutment of the internal and anterior abdominal facets of the tail meat of the previously-eviscerated lobster.

By a seventh feature of this second broad aspect of this invention, and/or the above features thereof, the stuffing within the lobster is steam-cooked until an internal temperature of between about 75° C. and about 85° C. is obtained, thereby to confer a mousse-like texture and desirable pink coloration to the stuffing blend.

By an eighth feature of this second broad aspect of this invention, and/or the above features thereof, the steam-cooked stuffed lobster is subsequently cooled by spray irrigation to the dorsal surface of the lobster, thereby to effect rapid-cooling to avoid overcooking and thereby to maintain high quality and integrity to the lobster meat and to the stuffing.

By two features of the third broad aspect of this invention, the lobster is Homaridae lobster, or the lobster is Spiny lobster.

By a third feature of this third broad aspect of this invention, the stuffed, intact, whole, lobster is in the form of frozen the stuffed, intact, whole, lobster.

By a fourth feature of this third broad aspect of this invention, the stuffed, intact, whole, lobster is in the form of initially-cooked, stuffed, intact, whole, lobster which has been cooked at about 100° C. for a sufficient time to achieve an internal carapace temperature of at least about 75° C. to about 85° C. By a first feature of that feature, the stuffed, intact, whole, lobster is in the form of a lobster which has been rapidly-cooled to effect rapid temperature removal, and finally which has been frozen. By a second feature of that feature, the stuffed, intact, whole, lobster is in the form of steam-cooked stuffed, intact, whole, lobster. By a third feature of that feature, the stuffed, intact, whole, lobster is in the form of steam-cooked and spray-irrigated-cooled the stuffed, intact, whole, lobster.

By a fifth feature of this third broad aspect of this invention, and/or the above features thereof, the proportions of the lobster roe and the lobster meat are in the range of between about 10% and about 50% by weight of the lobster roe and correspondingly between about 90% and about 50% by weight of the lobster meat.

By a sixth feature of this third broad aspect of this invention, and/or the above features thereof, the proportions of the lobster roe and the lobster meat are in the range of between about 10% and about 50% by weight of the lobster roe and correspondingly between about 90% and about 50% by weight of the lobster meat, and from about 1% by weight to about 10% by weight of a food grade starch in order to ensure freeze-thaw stability and performance of cooked blended stuffing.

By a seventh feature of this third broad aspect of this invention, and/or the above features thereof, the anterior visceral cavity of the lobster is effectively filled with the stuffing and integuous contact between the stuffing and the contour of the inner shell surface and the region of abutment of the internal and anterior abdominal facets of tail meat of the lobster is effected by having the stuffing introduced into the anterior visceral cavity of the previously-eviscerated lobster by oral intubation and subsequent vibration to effect removal of residual air.

By an eighth feature of this third broad aspect of this invention, and/or the above features thereof, the stuffing has been steam-cooked within the lobster until an internal temperature of between about 75° C. and about 85° C. is obtained to provide the stuffing blend in the form of a mousse-like texture and a desirable pink coloration.

By a ninth feature of this third broad aspect of this invention, and/or the above features thereof, the steam-cooked stuffed lobster has been subsequently cooled by spray irrigation to the dorsal surface of the lobster, whereby overcooking is avoided and thereby in which high quality and integrity to the lobster meat and to the stuffing blend is maintained.

By two features of the fourth broad aspect of this invention, the lobster is Homaridae lobster or the lobster is Spiny lobster.

By a third feature of this fourth broad species aspect of this invention, the lobster roe has been manually-removed from gravid female lobster.

By a fourth feature of this fourth broad species aspect of this invention, and/or the above features thereof, the proportions of the lobster roe and the lobster meat are in the range of between about 10% and about 50% by weight of the lobster roe and correspondingly between about 90% and about 50% by weight of the lobster meat.

By a fifth feature of this fourth broad species aspect of this invention, and/or the above features thereof, the proportions of the lobster roe and the lobster meat are in the range of between about 10% and about 50% by weight of the lobster roe and correspondingly between about 90% and about 50% by weight of the lobster meat, and from about 1% by weight to about 10% by weight of the food grade starch, in order to ensure freeze-thaw stability and performance of the cooked blended stuffing.

By a sixth feature of this fourth broad species aspect of this invention, and/or the above features thereof, the stuffing has been steam-cooked within the lobster until an internal temperature of between about 75° C. and about 85° C. is obtained to provide a mousse-like texture and a desirable pink coloration.

By four features of the fourth broad aspect of this invention, the crab is *Lithodes maja,* or the crab is *Neolithodes grimaldii,* or the crab is *Cancer pagurus,* or the crab is *Cancer borealis.*

By a fifth feature of this fourth broad aspect of this invention, the vacuum evisceration of the visceral cavity is accompanied by back-flushing with a dilute aqueous solution of lactic acid, thereby to confer bacteriostatic properties to the eviscerated crab. By one feature of that feature, the lactic acid is used in a concentration range of about 5 to about 20 ml/L (w/w).

By a sixth feature of this fourth broad aspect of this invention, and/or the above features thereof, the method includes the step of freezing the stuffed, intact, whole, crab.

By a seventh feature of this fourth broad aspect of this invention, and/or the above features thereof, the method includes the step of cooking the stuffed, intact, whole, crab at about 100° C. for a sufficient time to achieve internal carapace temperature of at least about 75° C., followed by subsequent rapid cooling to effect rapid temperature removal, and finally freezing the stuffed, intact, whole, crab. By a first feature of that feature, the cooking of the stuffed, intact, whole, crab is by steam-cooking. By a second feature of that feature, the cooling of the cooked stuffed, intact, whole, crab is by spray irrigation.

By an eighth feature of this fourth broad aspect of this invention, and/or the above features thereof, the raw stuffing blend comprising the crab roe and the crab meat is introduced into an anterior visceral cavity of previously eviscerated crab by oral intubation and subsequent vibration to effect removal of residual air, thereby to achieve effective filling of the visceral cavity effecting integuous contact between the blend and the contour of the inner shell surface and region of abutment of the internal and anterior abdominal facets of the tail meat of the previously-eviscerated crab.

By a ninth feature of this fourth broad aspect of this invention, and/or the above features thereof, the stuffing within the crab is steam-cooked until an internal temperature of between about 75° C. and about 85° C. is obtained, thereby to confer a mousse-like texture and desirable pink coloration to the stuffing blend.

By a tenth feature of this fourth broad aspect of this invention, and/or the above features thereof, the steam-cooked stuffed crab is subsequently cooled by spray irrigation to the dorsal surface of the crab, thereby to effect rapid-cooling to avoid overcooking and thereby to maintain high quality and integrity to the crab meat and to the crab stuffing.

By four features of the fifth broad aspect of this invention, the crab is *Lithodes maja*, or the crab is *Neolithodes grimaldii*, or the crab is *Cancer pagurus*, or the crab is *Cancer borealis*.

By a fifth feature of this fifth broad aspect of this invention, the stuffed, intact, whole, crab is in the form of frozen stuffed, intact, whole, crab.

By a sixth feature of this fifth broad aspect of this invention, the stuffed, intact, whole, crab is in the form of initially-cooked the stuffed, intact, whole, crab which has been cooked at about 100° C. for a sufficient time to achieve an internal carapace temperature of at least about 75° C. to about 85° C.

By a seventh feature of this fifth broad aspect of this invention, the stuffed, intact, whole, crab is in the form of a crab which has been rapidly-cooled to effect rapid temperature removal, and finally which has been frozen.

By an eighth feature of this fifth broad aspect of this invention, the stuffed, intact, whole, crab is in the form of steam-cooked the stuffed, intact, whole, crab.

By a ninth feature of this fifth broad aspect of this invention, the stuffed, intact, whole, crab is in the form of steam-cooked and spray-irrigated-cooled the stuffed, intact, whole, crab.

By a tenth feature of this fifth broad aspect of this invention, and/or the above features thereof, the proportions of the crab roe and the crab meat are in the range of between about 10% and about 50% by weight of the crab roe and correspondingly between about 90% and about 50% by weight of the crab meat.

By an eleventh feature of this fifth broad aspect of this invention, and/or the above features thereof, the proportions of the crab roe and the crab meat are in the range of between about 10% and about 50% by weight of the weight of the crab roe and correspondingly between about 90% and about 50% by weight of the crab meat, and from about 1% by weight to about 10% by weight of a food grade starch in order to ensure freeze-thaw stability and performance of cooked blended stuffing.

By a twelfth feature of this fifth broad aspect of this invention, and/or the above features thereof, the anterior visceral cavity of the crab is effectively filled with the stuffing and integuous contact between the stuffing and the contour of the inner shell surface and the region of abutment of the internal and anterior abdominal facets of tail meat of the crab is effected by having the stuffing introduced into the anterior visceral cavity of the previously-eviscerated crab by oral intubation and subsequent vibration to effect removal of residual air.

By a thirteenth feature of this fifth broad aspect of this invention, and/or the above features thereof, the stuffing has been steam-cooked within the crab until an internal temperature of between about 75° C. and about 85° C. is obtained to provide the stuffing blend in the form of a mousse-like texture and a desirable pink coloration.

By a fourteenth feature of this fifth broad aspect of this invention, and/or the above features thereof, the steam-cooked stuffed crab has been subsequently cooled by spray irrigation to the dorsal surface of the crab whereby overcooking is avoided and thereby in which high quality and integrity to the crab meat and to the stuffing blend is maintained.

By four features of the sixth broad aspect of this invention, the crab is *Lithodes maja*, or the crab is *Neolithodes grimaldii*, or the crab is *Cancer pagurus*, or the crab is *Cancer borealis*.

By a fifth feature of this sixth broad aspect of this invention, the crab roe has been manually-removed from gravid female crab.

By a sixth feature of this sixth broad aspect of this invention, and/or the above features thereof, the proportions of the crab roe and the crab meat are in the range of between about 10% and about 50% by weight of the crab roe and correspondingly between about 90% and about 50% by weight of the crab meat.

By a seventh feature of this sixth broad aspect of this invention, and/or the above features thereof, the proportions of the crab roe and the crab meat are in the range of between about 10% and about 50% by weight of the crab roe and correspondingly between about 90% and about 50% by weight of the crab meat, and from about 1% by weight to about 10% by weight of a food grade starch, in order to ensure freeze-thaw stability and performance of cooked blended stuffing.

By an eighth feature of this sixth broad aspect of this invention, and/or the above features thereof, the stuffing is in the form of a mousse-like texture and a desirable pink coloration, by being steam-cooked within the crab until an internal temperature of between about 75° C. and about 85° C. is obtained.

BRIEF DESCRIPTION OF THE DRAWINGS

In the accompanying drawings,

FIG. 3 is a flow chart of the steps carried out according to the method of one feature of this invention for the processing of a lobster of the Homaridae family, in which

FIG. 5 is a flow chart of the steps carried out according to the method of another feature of the invention for the processing of a Spiny lobster, in which

FIG. 6 is a view of a crab of the *Lithodes maja* family, i.e., the Northern Stone crab, in which FIG. 6A is a view of one half including the carapace, legs and claws in dorsal aspect, FIG. 6B is a view of the male abdomen, FIG. 6C is a view of the female abdomen and FIG. 6D is an overall view;

FIG. 7 is a view of a crab of the *Neolithodes grimaldii* family, i.e., the Porcupine crab, in which FIG. 7A is a view of one half including the carapace, legs and claws, FIG. 7B is a view of the male abdomen, FIG. 7C is a view of the female abdomen and FIG. 7D is an overall view;

FIG. 9 is a photograph of crabs, i.e.

DESCRIPTION OF THE PRIOR ART

Figure 1:
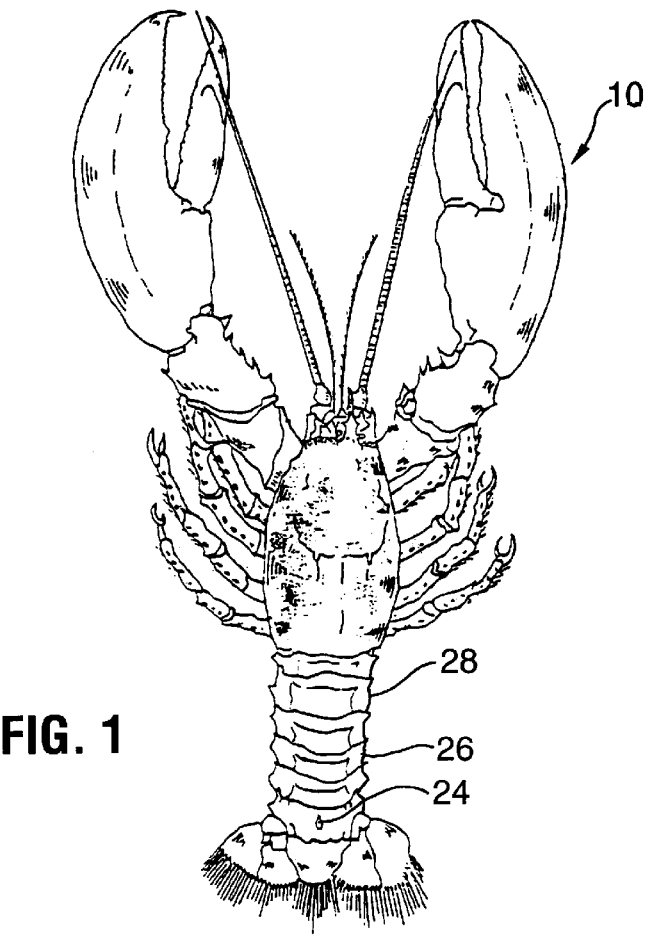
FIG. 1 is a top view of a whole lobster of the Homaridae family.
Figure 2:
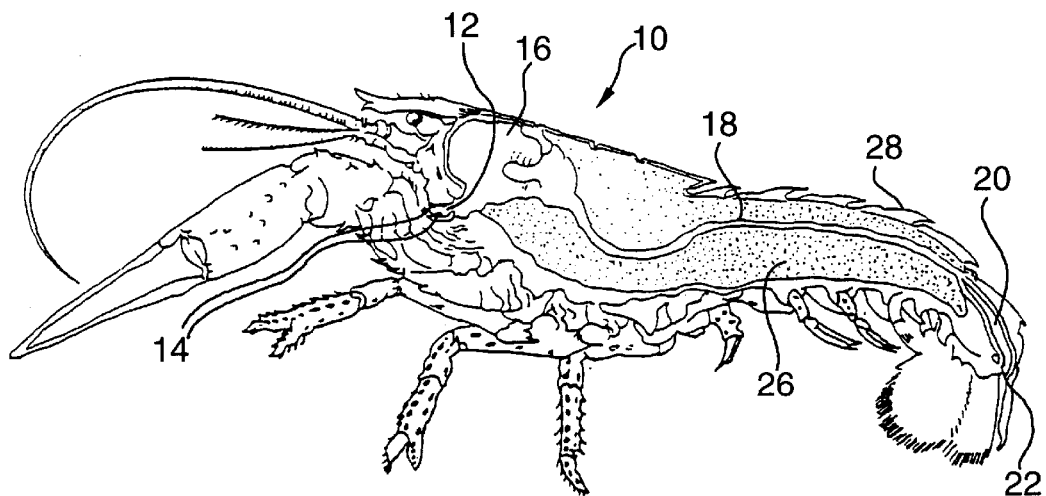
FIG. 2 is a side view, in half-section, of the whole lobster shown in FIG. 1.

One prior art technique of cleaning-out the internal system of a lobster of the Homaridae family is by flushing-out with a suitable solution. Referring to FIGS. 1 and 2, flushing of a lobster 10 can be carried-out by inserting a spray nozzle (not seen) into the mouth 12 of the lobster 10 through mandibles. Sea water or salt water, which is at room temperature or colder, is sprayed through the spray nozzle, under a pressure of from 5 psig to 20 psig. The stomach contents are generally flushed-back-out through the mouth 12, thus cleaning-out the stomach 14. Moreover, the pressurized water is effective to flush-out the undesirable contents of the intestinal track 18 and cloaca 20 through the anus 22. In this manner, the organic and inorganic debris is eliminated from the gastrointestinal system of the lobster.

One previously-described spray nozzle device for carrying-out the flushing step, as taught by the prior art, is a thin hollow tube having a 1/16 inch orifice at the end, and four additional 1/16 inch orifices, spaced at 90° intervals about the side walls of the tube. Flushing is achieved when the spray nozzle is inserted through the mouth 12 and the mandibles 14 of the lobster 10, and is thereafter rotated-about by hand within the lobster 10.

Another technique for removing the contents of the internal organs of the lobster is effective, a preferred technique for cleaning-out the hind-gut of the lobster, as taught by the prior art, involves suction evisceration. This technique comprises making a small slit 24 in the abdomen (lobster tail) 26 in the area of the cloaca 20 of the lobster 10. Although this slit may be made on the top-side or the under-side of the lobster, the slit may be made through the posterior part of the abdominal shell 28 on the top-side of the lobster 10. A vacuum tube (not seen) is then inserted through the slit 24, and is used to suck-out the whole hind-gut comprising the intestinal tract (vein) 18 and cloaca 20. Suction evisceration of the hind-gut is generally always carried-out prior to cooking.

As taught by the prior art, the suction nozzle (not seen) will generally have an inside diameter of 1/4 inch, in order effectively to remove the hind-gut of the lobster 10. Also, the nozzle (not seen) will generally be operated under a vacuum of from 15 inches to 25 inches Hg, and removal of the hind-gut can generally be accomplished in from 3 seconds to 5 seconds.

The stomach 16 of the lobster 10 can subsequently be removed by insertion of the suction nozzle through the mouth 12 between mandibles 14. Suction removal of the stomach 16 and the stomach contents generally requires a longer period of time than the suction-removal of the hind-gut, and usually will require from 5 seconds to 15 seconds.

DESCRIPTION OF PREFERRED EMBODIMENTS

The method of one embodiment of this invention will now be described with reference to the processing of clawed lobsters of the Homaridae family. However, it is desired to emphasize that, with suitable modifications which will be apparent to those skilled in the art, this method can also be applied to the Rock lobster species of temperate and tropical origin, and including species of the genera Panulirus, Jasus and Chelonectes crab, and to lobster-like crustaceans, including some types of prawn, *Nephrops norwegicus* and freshwater crayfish species.

The method as applied to Spiny lobster will be described hereinafter with reference to FIG. 5.

The method applied to hard-to-process species of crab shown in FIG. 6, FIG. 7 and FIG. 9 will be described hereinafter with reference to FIG. 8.

Figure 3A:
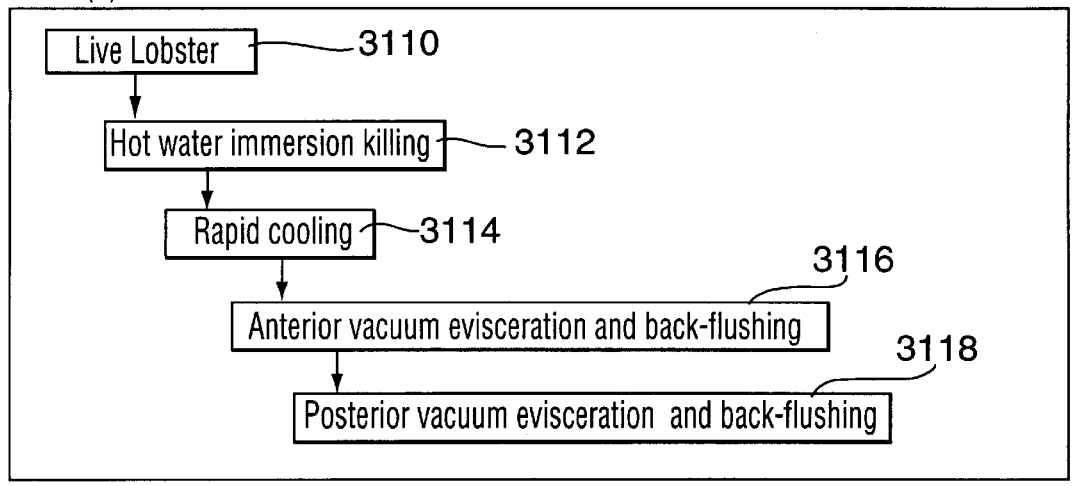
FIG. 3A illustrates the first two out of five preparative steps which are followed to obtain the stuffed lobster product.
Figure 3A:
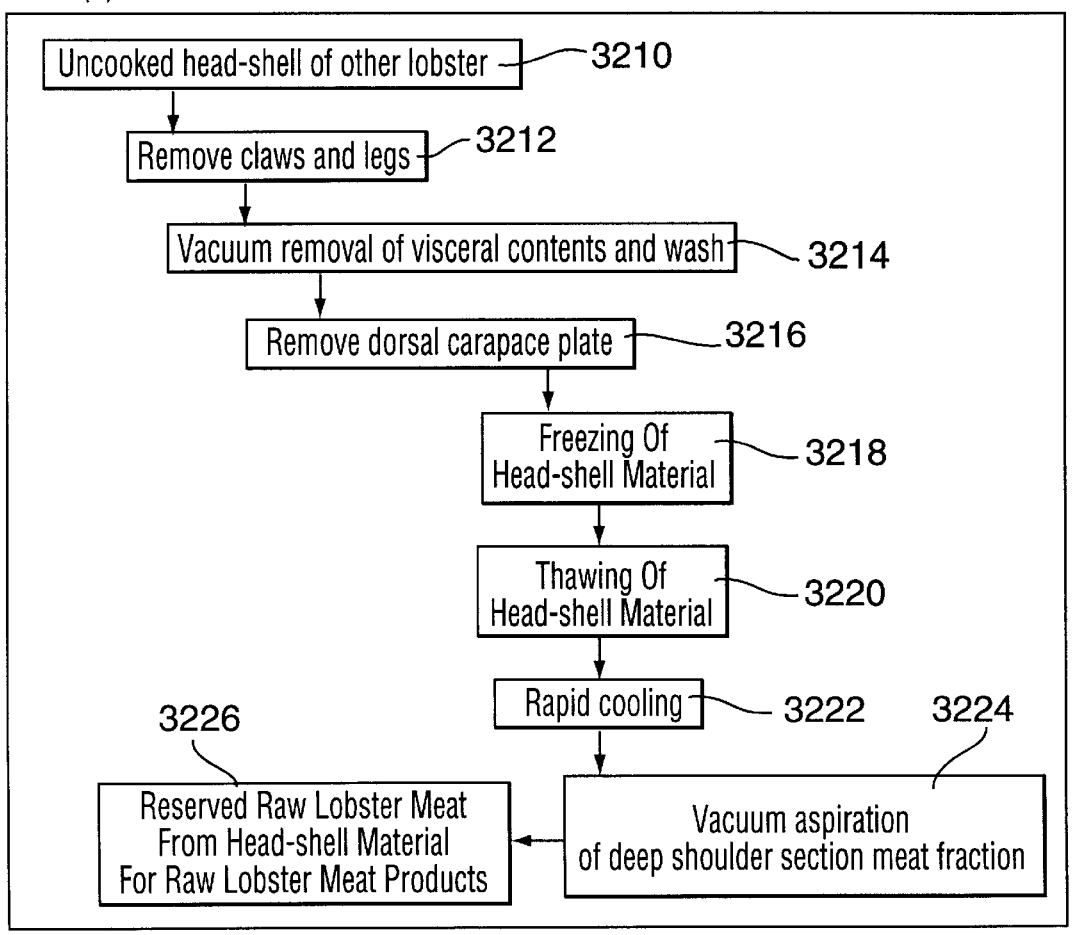
Figure 3B:
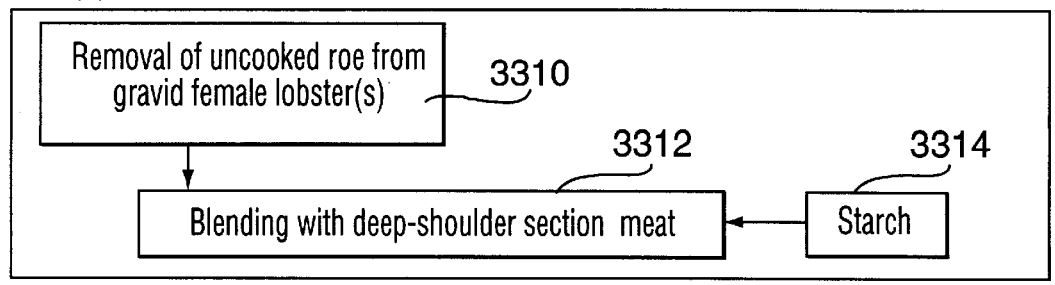
FIG. 3B illustrates the last three out of five preparative steps which are followed to obtain the stuffed lobster product.
Figure 3B:
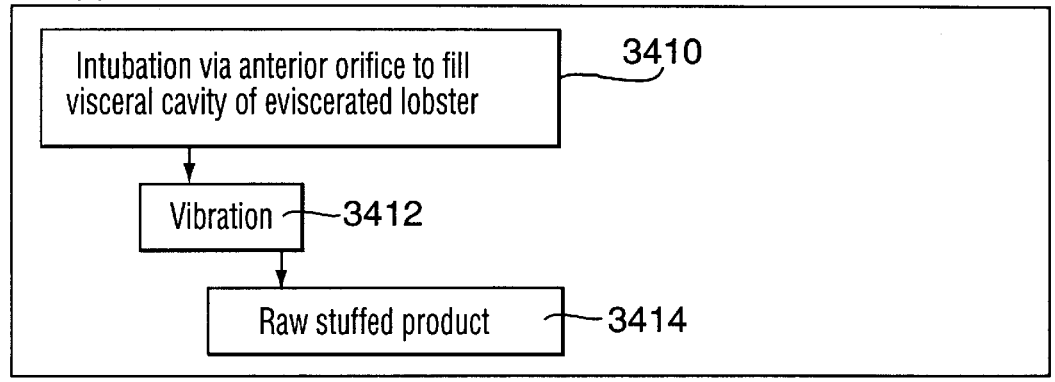
Figure 3B:
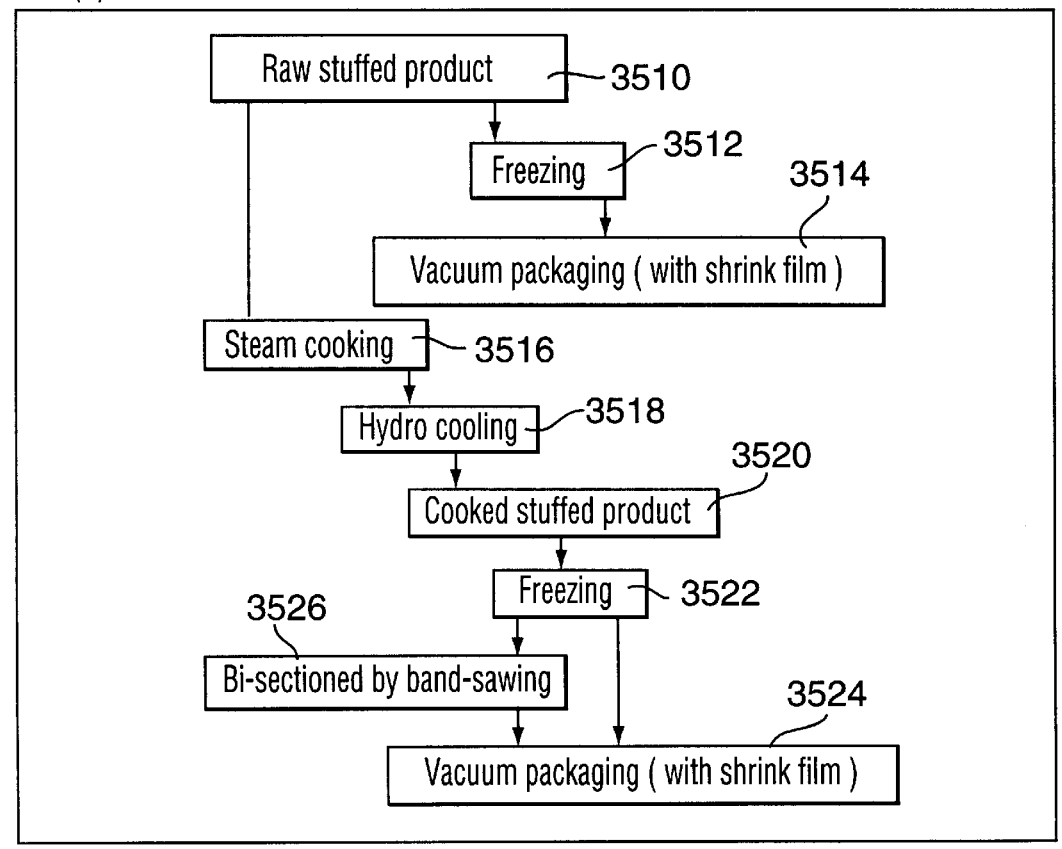

(a) Description of FIG. 3A and FIG. 3B

The method involved in one embodiment of the present invention for preparing a stuffed lobster product of the lobster of the Homaridae family is comprised of five steps, respectively referred to as (1), (2), (3), (4) and (5), and are described with reference to FIG. 3A and FIG. 3B.

Step (1)

The first step, Step (1) of the method of this embodiment of the invention, involves killing of live lobsters (block 3110) by hot-water blanch immersion (block 3112), under temperature conditions ranging between about 50° C. and about 95° C., for a duration of between about 40 seconds to about 80 seconds, with immediate transfer to cold water conditions (block 3114) under temperature conditions ranging between about 0° C. to 10° C. for a duration of between about 2 minutes to about 10 minutes. Lobsters, so-treated, are then subjected to vacuum evisceration of the anterior visceral region (block 3116), e.g., as described above, using a vacuum aspirator nozzle of between about 10 cm to about 16 cm in length with a diameter of between about 5 mm to about 10 mm inserted into the oral cavity. Concurrently with this procedure, a back-flushing pipe attached to the vacuum nozzle supplies a dilute solution of lactic acid in a concentration range of about 5 mg/L to about 20 mg/L (w/w) as a bacteriostatic agent. The vacuum is applied in the range of about 15 inches to about 25 inches of Hg and the visceral contents are removed in a period of time ranging between about 5 seconds to about 15 seconds. Following this procedure, a second vacuum aspirating nozzle with a length ranging between about 5 cm to about 15 cm and a diameter of between about 1 mm to about 5 mm is inserted into the anal orifice, to effect vacuum cleaning, and concurrently back-flush irrigation (block 3118) with a dilute solution of lactic acid in a concentration range of about 5 mg/L to about 20 mg/L (w/w) as a bacteriostatic agent. The latter procedure is preferably accomplished within a period of between about 5 seconds and about 20 seconds. In one preferred embodiment, the above eviscerated and back-flushed lobster product is maintained in either a fresh or frozen-thawed condition prior to inclusion of the stuffing-blend material.

Step (2)

In the second step, Step (2) of the method of this embodiment of the invention, raw head-shell sections of lobsters (block 3210), generally have been derived from lobsters which have been subjected to raw-tail-severance procedures, are then subjected to vacuum removal of visceral contents and washing, as previously-described (block 3214). Then the lobster is prepared for further processing by manual removal of legs and claws (block 3212), prior to the manual removal of the dorsal carapace plate (block 3216), which reveals the remaining head-shell section containing the edible meat fractions which are intimately-connected and associated with the cartilaginous exoskeleton. Particularly, the deep-shoulder sections yielding up to about 5% of edible meat fraction from the lobster are the focus of this second step. Head-shell carapace material, soprepared, is subjected to at least one cycle of freezing (block 3218) and thawing (block 3220), which facilitates the subsequent vacuum aspiration of the deep-shoulder myotomal meat from the deep-shoulder fraction. The thawing is carried out in cold water or cold dilute brine in the temperature range of about 1° C. to about 10° C. for about 1 minute to about 10 minutes, preferably between about 3 minutes and about 8 minutes, to minimize deterioration of the flavour of the thawed lobster meat and to facilitate the separation of the shell from the meat. Following the thawing procedure, the head-shell material is immediately-transferred to cold water conditions for rapid-cooling (block 3222), to a temperature range of between about 1° C. and about 10° C. for a period of time between about 3 minutes and about 8 minutes. This procedure provides for rapid-cooling of the material and maintenance of the quality attributes of the lobster meat components. The loosened deep-shoulder myotomal lobster meat is then removed from the deep-shoulder compartments by vacuum aspiration (block 3224), utilizing a vacuum nozzle of between about 10 cm to about 16 cm length and a diameter of between about 5 mm and about 10 mm. Deep-shoulder myotomal lobster meat so-removed, is collected in pan-traps which are associated with the vacuum line, providing a vacuum between about 15 inches to about 25 inches of Hg. In this embodiment, vacuum extraction of between about 1 kg to about 2 kg per person/hour of raw deep-shoulder myotomal lobster meat can be obtained. The deep-shoulder myotomal lobster meat so-extracted can either be held chilled, or frozen prior to further use, for the stuffing to be described in Step (3), hereinafter, or it may be reserved for other applications in other conventional raw lobster meat products and recipes (block 3226).

The reserved raw deep-shoulder myotomal lobster meat which is retrieved from the head-shell in Step (2) can thus be used for a variety of other lobster products.

Step (3)

In the third step, Step (3) of the method of this embodiment of the invention, raw roe is removed from the head-shell section of gravid female lobsters (block 3310), and the lobster is subjected to traditional raw-tail severance processing methods. The roe is manually-extracted and subjected either to chilling, or freezing under vacuum conditions. If frozen, the roe must be thawed prior to blending with the deep-shoulder section lobster meat which has been extracted according to procedures described in the above Step (2). The roe and the deep-shoulder myotomal lobster meat fractions are blended together (block 3312) in proportions ranging from between about 10% to about 50% for the roe, and correspondingly about 90% to about 50% for the deep-shoulder myotomal lobster meat. The blending procedure is preferably achieved by use of a food processor, e.g., the one sold by Mari-tech Ltd. (Canada) until a creamy liquid consistency is achieved. During such processing, from about 90 g to about 990 g per kilogram of blend, and e.g., from about 10 g to about 100 g of an edible starch, e.g., the one sold by Nacan Products Limited (USA), is added to the blend (block 3314), to ensure its freeze-thaw stability. The lobster roe and the deep-shoulder myotomal lobster meat extracted as described in Step (2) above (block 3310) is mixed with the starch (block 3314). The lobster roe and the deep-shoulder myotomal lobster meat extracted as described in Step (2) above (block 3310) to the starch (block 3314) weight ratio may vary from between about 5:5 to about 9:1, a desirable range being from about 6:4 to about 8:2.

The paste of lobster roe and the deep-shoulder myotomal lobster meat extracted as described in Step (2) above and a starch mixture (block 3312) may be mixed under reduced pressure. Ordinarily, the mixing under reduced pressure may be accomplished by agitating in an agitator that can be sealed hermetically, and can provide inside an environment of reduced pressure. The degree of reduced pressure is e.g., about 0 mm to about 260 mm Hg. According to this embodiment of the present invention, the mixture may be agitated rapidly at a reduced pressure near vacuum. The mixing may be successfully-accomplished under such reduced pressure, at about 260 mm of Hg pressure or less.

Examples of suitable agitators include a mixer, kneader, cutter, etc. which permit adequate agitation, e.g., one where all of the mixture can be utilized at one time. For example, an agitator which may be used is one that is provided with a moving vane inside thereof, which rotates at the rate of about 40 rpm. The agitator may be provided with a cover in the upper part to be sealed hermetically, and is connected with a decompression device via a hose to keep the pressure of about 0 mm to about 260 mm Hg inside the agitator. At this point, the stuffing blend can either be frozen, preferably under vacuum, or intubated into eviscerated lobsters in the chilled form.

Step (4)

In the fourth step, Step (4) of this method of this embodiment of this invention, the raw stuffing blend prepared from the raw lobster roe and the deep-shoulder myotomal lobster meat components, as described above, are introduced into the eviscerated and back-flushed visceral cavity of the lobster, via oral intubation (block 3410). In this procedure, a metering pump can be utilized, e.g., the one sold by Mari-tech Ltd. (Canada). Dependent upon the size range of the lobster, the amount of stuffing blend which is introduced in the oral cavity will vary. By way of example, the principles of this embodiment of this invention can be applied to lobsters of varying size range, and most commonly weigh between about 250 g and about 1.5 kg. Such amounts which are required to fill the visceral cavity of lobsters amount to between about 10% and about 15% of the final weight of the lobster. Following metered filling of the visceral cavity, the lobster is subjected briefly to mechanical vibration (block 3412), wherein the filled lobster is maintained in a vertical position, with the oral cavity facing uppermost and is subjected to a gentle vibrating force. In this procedure, any residual air pockets which are entrained within the visceral cavity are voided and a complete fill of the cavity is ensured. The final product of this step is a raw stuffed lobster product (block 3414).

Step (5)

In the final fifth step, Step (5), of this method of this embodiment of this invention, the raw stuffed lobster product (block 3510) can either be frozen as is, for subsequent thawing and cooking (block 3512), and then vacuum-packed with shrunk-film (block 3514), or it can be subject to immediate cooking in atmospheric steam conditions (block 3516) of about 100° C. Advantageously, very good results have been obtained by placing the raw stuffed lobster ventral side uppermost into a process dedicated steam chamber, e.g., the one sold for this purpose by Atlantic Systems Manufacturing Ltd. (Canada), with sufficient duration to achieve an internal temperature in the centre point of the stuffing blend of within the visceral cavity of between about 70° C. to about 85° C. This procedure is generally-achieved in a time-frame of between 15 minutes to 20 minutes, and serves to cook the lobster and stuffed contents while still maintaining the integral tail, leg and claw meat sections in an optimal condition. Immediately following attainment of the desired internal temperature, of between about 75° C. to about 85° C., and to avoid post-cook drying of the delicate meat and stuffing blend, it has been proven necessary to cool the cooked product is cooled rapidly.

The optimal method of cooling the cooked lobster product has been to subject the cooked lobster to hydro-cooling by cold water spray irrigation (block 3518), directed as a drench to the dorsal surface of lobsters which are positioned with the dorsal surface uppermost. Most efficient results have been obtained through the use of a processsdedicated hydro-cooling device, e.g., the one sold by Atlantic Systems Manufacturing Ltd. (Canada). In such application, optimal results can be obtained through the use of either potable fresh water or sea water, in the temperature range of between about 1° C. and about 9° C., for a cooling period of between about 5 minutes and about 10 minutes, then effecting acceptable heat-reduction from within the centre of the lobster to between about 20° C. to about 30° C. Other procedures involving immersion in ice-water mixes or ice per se can be utilized, but these procedures do not lend themselves to industrial assembly line applications.

As a part of this final step, either raw stuffed lobster is subjected to freezing (block 3512), or steam-cooked and cooled stuffed lobster is subjected to freezing conditions (block 3522). In either case, the frozen lobster is then packaged in vacuumsealable pouches under deep vacuum, in the range of about 25 inches to about 30 inches of Hg (block 3514 or block 3524). Optionally, prior to packaging, frozen stuffed and cooked lobster can be bi-sectioned (block 3526), along the longitudinal axis by band-sawing and reconfigured as an intact product prior to vacuum packaging. In terms of the packaging material, optimum shelf-life results are obtained through use of a heavy-duty shrinkable film laminate, e.g., the material sold by Cryovac (Canada). Moreover, the subsequent film-shrinking by heat exposure serves to minimize potential for breakage of appendages and body parts of the lobster, which is a recognized problem due to the brittle shell characteristics of the lobster.

With the above-described preparative methods of this embodiment of this invention, and with the equipment specifically-designed to support the procedures, up to about 400 units per hour of finished lobster products can be processed, which is commercially interesting and appealing.

The product, so-obtained, has proven to have excellent taste and texture characteristics, served in either the intact form, or as bi-sectioned split halves. The product can be presented as either chill-thawed or re-warmed, as preferred by consumers. The high-quality appearance of the product is assured through definition of very white meat containing no visible intestinal content, nor hepatopancreatic visceral staining, and a very attractive coral pink stuffing, which through the preparative method is assured, of attaining very intimate entrainment and interface to the internal shell contours and anterior abdominal facet of the tail meat. The overall appearance is of a continuum of stuffing-blend and white tail meat. This embodiment of this invention serves to meet ever increasingly-stringent requirements by nations for minimum acceptable tolerance levels for certain heavy-metal components.

Figure 4:
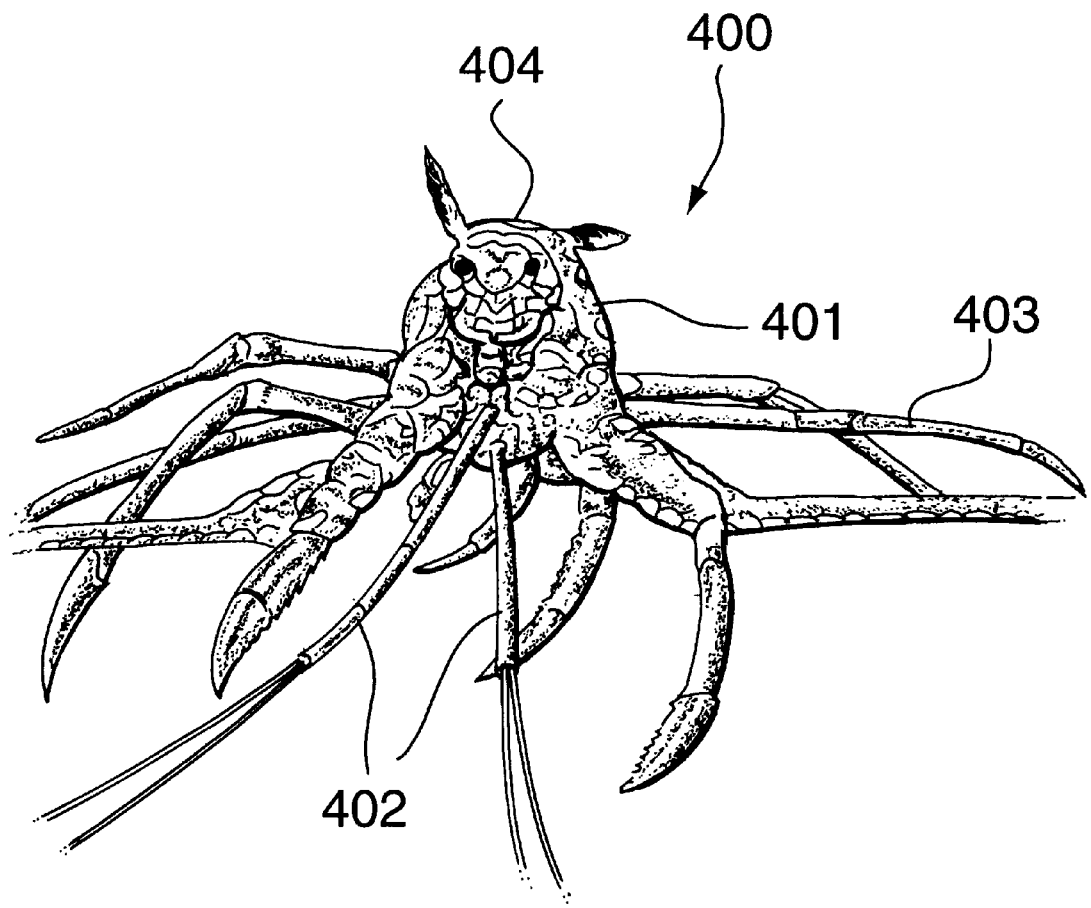
FIG. 4 is a photograph of a perspective front view of a Spiny lobster showing the carapace, the antennae, and the legs.

(b) Description of FIG. 4

FIG. 4 shows a perspective view of a Spiny lobster 400, showing the carapace 401, the antennae 402, the legs 403 and the tail (or body) 404. The Spiny lobster is prevalent in tropical waters, e.g., off Cuba, Belize, Mexico, Brazil, and Australia.

Figure 5A:
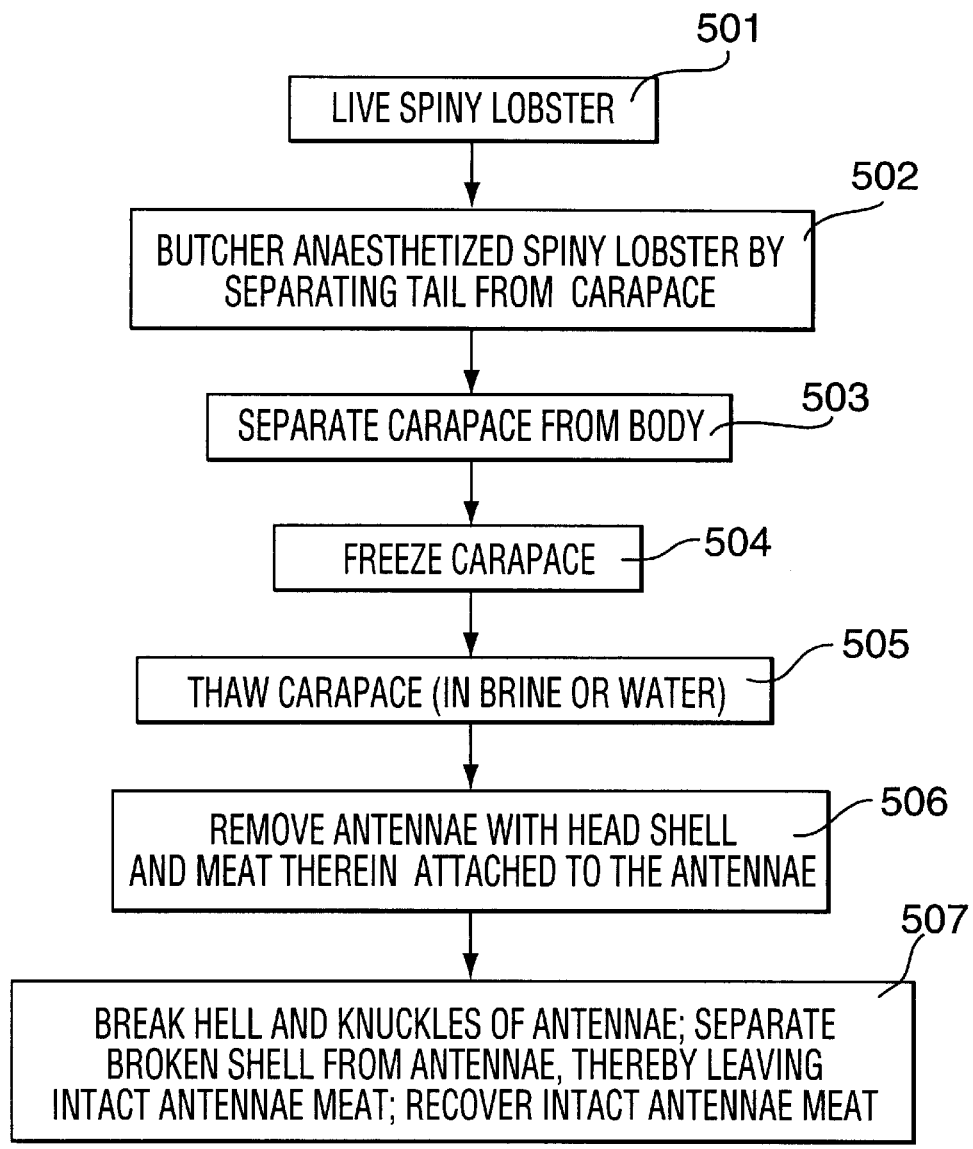
FIG. 5A illustrates the steps for the recovery of antennae meat.
Figure 5B:
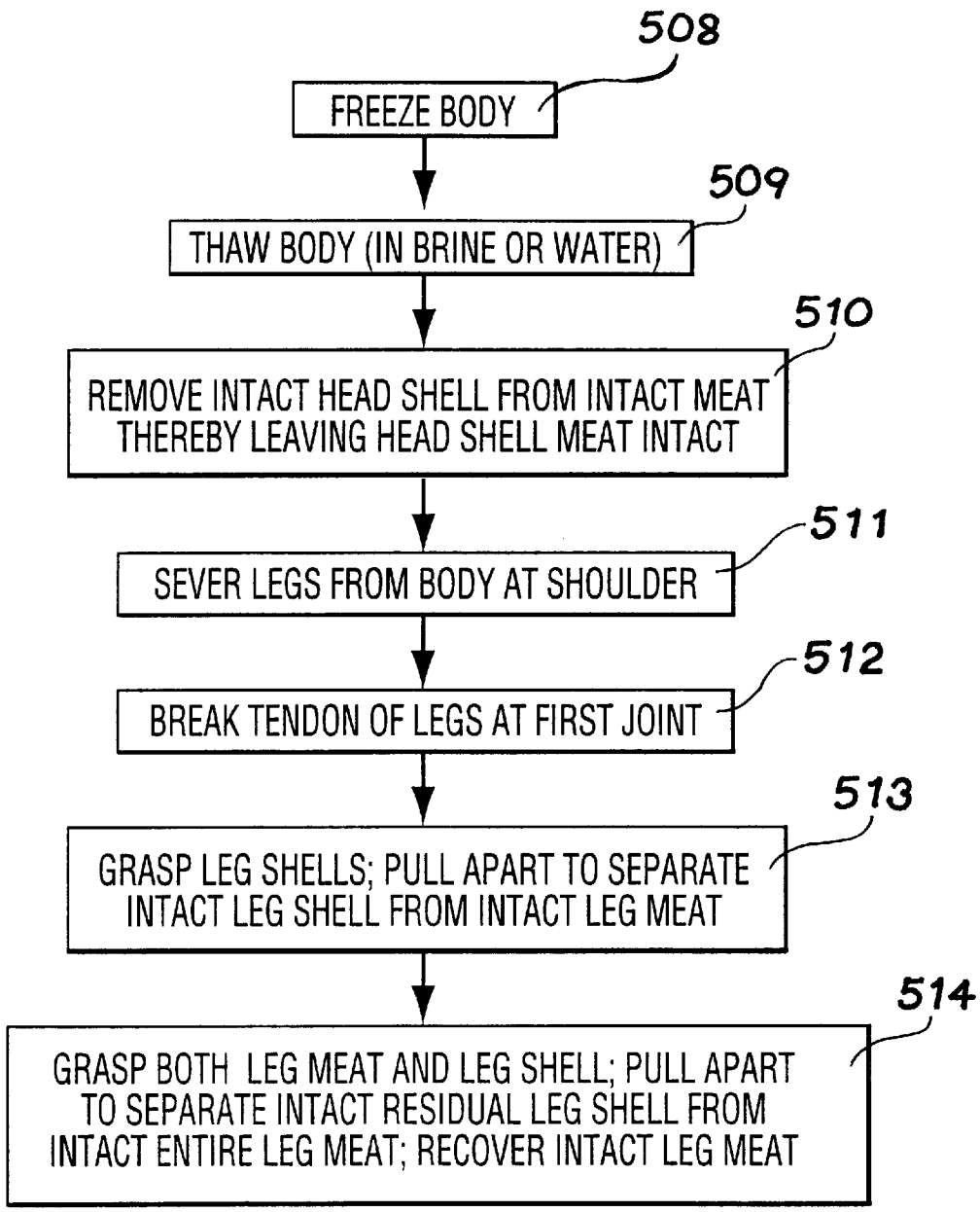
FIG. 5B illustrates the steps for the recovery of leg meat.
Figure 5C:
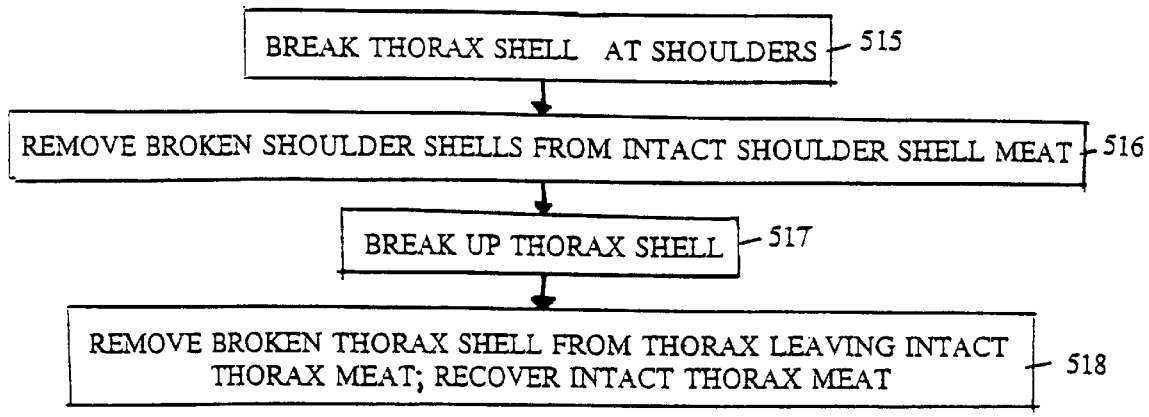
FIG. 5C illustrates the steps for the recovery of thorax meat.

(c) Description of FIG. 5A, FIG. 5B and FIG. 5C

The steps in the processing of the Spiny lobster is shown in the flow sheets of FIG. 5. In FIG. 5A, the live Spiny lobster, (block 501), is anaesthetized, e.g., by immersion in a dilute aqueous solution of a metabisulphite, and then is butchered by separating the tail from the carapace, (block 502). The carapace 401 is separated from the body, (step 503). The carapace is frozen at a temperature ranging from about −10° C. to about −20° C., (step 504). The carapace 401 is then thawed either in cold water or in dilute brine, of about 2 to about 3% by weight of sodium chloride, until a temperature of about 4° C. to about 12° C. is reached, (step 505). Thawing in cold water or in cold dilute brine facilitates separation of the shell from the meat, and minimizes the deterioration of the flavour of the thawed meat.

The antennae 402 with the head shell and meat therein attached to the antennae is removed from the carapace, (step 506). The head shell is then removed from the meat by the following steps:

The shell and the knuckles of the antennae are broken manually, e.g., by impact with a hammer. Each broken shell segment is grasped and is easily removed from the antennae meat due to the fact that adherence of the shell to the meat was being broken by the freeze-thaw cycle. The intact antennae meat is then recovered, for use in any raw lobster meat products, including possible use in a lobster stuffing, as will be described hereinafter. These steps are collectively designated step 507.

FIG. 5B shows the steps in the processing of the body 404. The body 404 is frozen at a temperature ranging from about −10° C. to about −20° C., (step 508). The body 404 is then thawed either in water or in dilute brine, of about 2% to about 3% by weight of sodium chloride, until a temperature of about 4° C. to about 12° C. is reached, (step 509). Thawing in cold water or in cold dilute brine facilitates separation of the shell from the meat, and minimizes the deterioration of the flavour of the thawed meat. Because the adherence of the head shell to the head shell meat has been broken by the freeze-thaw cycle, the intact head shell is easily manually removed from the intact head shell meat. The intact head shell meat is then recovered for use in any lobster meat products, including possible use in a lobster stuffing, as will be described hereinafter. These steps are collectively designated step 510.

The legs 403 are then manually severed from the body at the shoulder, (step 511). The tendon at the first joint of the leg 403 is cut. Then the intact leg shell is separated from the intact leg meat by the following steps:

The intact shells of the two parts of the leg, namely the outer part, and the part adjacent to the shoulder, are grasped with different hands, and then pulled apart. The intact shell of the outer part of the leg separates from intact leg meat, and the intact shell is discarded. The intact whole shell meat and the shell of the part adjacent to the shoulder are grasped with different hands and pulled apart. The intact shell separates from the intact leg meat. The intact whole entire leg meat is recovered. These steps are collectively designated step 512, step 513 and step 514. The intact entire whole leg meat is recovered for use in any lobster meat product.

The final stages in the processing of the Spiny lobster are shown in FIG. 5C.

The thorax shell is manually severed at the shoulders, (step 515).

Each severed shoulder shell segment is then grasped and separated from the intact thorax meat. This separation is facilitated since the adherence of the shell to the meat has been broken by the freeze-thaw cycle. The step is designed 516.

The thorax shell is then manually broken up into segments, (step 517).

Each broken thorax shell segment is grasped and removed from the intact thorax meat until all the broken thorax shell segments have been removed, leaving the entire intact thorax meat, which is recovered for use in any lobster meat products, including possible use in a lobster stuffing, as will be described hereinafter. These steps are designated step 518.

It is possible to use the so-recovered Spiny lobster meat to provide a lobster stuffing. While the provision of such a lobster stuffing using the lobster meat which is recovered from the Spiny lobster is not shown by drawings, a generalized description thereof now follows:

Raw roe is manually-extracted from the head-shell section of gravid female Spiny lobsters and may be subjected, either to chilling, or freezing under vacuum conditions. If frozen, the roe must be thawed prior to blending with the lobster meat which has been extracted according to procedures described above. The Spiny lobster roe and the Spiny lobster meat fractions are blended together in a proportion ranging from between about 10% to about 50% for the roe, and correspondingly about 90% to about 50% for the lobster meat. The blending procedure is preferably achieved by use of a food processor, e.g., the one sold by Mari-tech Ltd. (Canada) until a creamy liquid consistency is achieved. During such processing, from about 90 g to about 990 g per kilogram of blend, and e.g., from about 10 g to about 100 g of an edible starch, e.g., the one sold by Nacan Products Limited (USA), is added to the blend, to ensure its freeze-thaw stability. The lobster roe and the lobster meat extracted as described above is mixed with the starch. The weight of the lobster roe and the lobster meat extracted as described above to the starch may vary from between about 5:5 to about 9:1, a desirable range being from about 6:4 to about 8:2.

The paste of lobster roe and lobster meat extracted as described above and starch mixture may be mixed under reduced pressure. Ordinarily, the mixing under reduced pressure may be accomplished by agitating in an agitator that can be sealed hermetically, and can provide inside an environment of reduced pressure. The degree of reduced pressure is e.g., about 0 mm to about 260 mm Hg. The mixture may be agitated rapidly at a reduced pressure near vacuum. The mixing may be successfully-accomplished under such reduced pressure, at about 260 mm of Hg pressure or less.

Examples of suitable agitators include a mixer, kneader, cutter, and so on which permit adequate agitation, e.g., one where all, mixer, etc., can be utilized at one time. For example, an agitator which may be used is one that is provided with a moving vane inside thereof, which rotates at the rate of about 40 rpm. The agitator may be provided with a cover in the upper part to be sealed hermetically, and is connected with a decompression device via a hose to keep the pressure of about 0 mm to about 260 mm Hg inside the agitator. At this point, the stuffing blend can either be frozen, preferably under vacuum, or be retained for further use.

The raw stuffing blend prepared from raw Spiny lobster roe and Spiny lobster meat components, as described above, may be introduced into the eviscerated and back-flushed visceral cavity of a lobster either of the Homaridae family or a Spiny lobster, via oral intubation. Moreover, raw Homaridae lobster roe may be mixed with Spiny lobster meat recovered as described above to provide a stuffing for either a Homaridae lobster or a Spiny lobster. Alternatively, a Spiny lobster body may be eviscerated and back-flushed in the same manner as described above for the lobster of the Homaridae family, of the permutations of stuffing blends, e.g., roe of lobster of the Homaridae family and meat of lobster of the Homaridae family, roe of lobster of the Homaridae family and meat of the Spiny lobster, roe of the Spiny lobster and meat of lobster of the Homaridae family, and roe of the Spiny lobster and meat of the Spiny lobster, can be introduced into the eviscerated and back-flushed visceral cavity of a Spiny lobster. In this procedure, a metering pump can be utilized, e.g., the one sold by Mari-tech Ltd. (Canada). Dependent upon the size range of the lobster, the amount of blend introduced in the oral cavity will vary. By way of example, the principles of this embodiment of this invention can be applied to Spiny lobsters of varying size range, and most commonly weigh between about 250 g and about 1.5 kg. Such amounts required to fill the visceral cavity of Spiny lobsters amount to between about 10% and about 15% of the final weight of the lobster. Following metered filling of the visceral cavity, the Spiny lobster is subjected briefly to mechanical vibration, wherein the filled Spiny lobster is maintained in a vertical position, with the oral cavity facing uppermost and subjected to a gentle vibrating force. In this procedure, any residual air pockets entrained within the visceral cavity are voided and a complete fill of the cavity is ensured. The final product of this step is a raw stuffed lobster product, either a lobster of the Homaridae family or a Spiny lobster.

The raw stuffed lobster can either be frozen as is, for subsequent thawing and cooking, and then vacuum-packed with shrunk-film, or it can be subject to immediate cooking in atmospheric steam conditions of about 100° C. Advantageously, the raw stuffed Homaridae lobster or Spiny lobster may be placed ventral side uppermost into a process dedicated steam chamber, e.g., the one sold for this purpose by Atlantic Systems Manufacturing Ltd. (Canada), with sufficient duration to achieve an internal temperature in the centre point of the stuffing blend of within the visceral cavity of between about 70° C. to about 85° C. This procedure may be generally-achieved in a time-frame of between about 15 minutes to about 20 minutes, and would serve to cook the Homaridae lobster or Spiny lobster and stuffed contents while still maintaining the integral tail, leg and claw meat sections in an optimal condition. Immediately following attainment of the desired internal temperature, of between about 75° C. to about 85° C., and to avoid postcook drying of the delicate meat and stuffing blend, the cooked Homaridae lobster or Spiny lobster should be cooled rapidly.

The optimal method of cooling the cooked Homaridae lobster or Spiny lobster product would be to subject the cooked Homaridae lobster or Spiny lobster to hydrocooling by cold water spray irrigation, directed as a drench to the dorsal surface of Homaridae lobster or Spiny lobster positioned with the dorsal surface uppermost. This may be accomplished through the use of a process-dedicated hydrocooling device, e.g., the one sold by Atlantic Systems Manufacturing Ltd. (Canada). In such application, optimal results can be obtained through the use of either potable fresh water or sea water, in the temperature range of between about 1° C. and about 9° C., for a cooling period of between about 5 minutes and about 10 minutes, then effecting acceptable heat-reduction from within the centre of the lobster to between about 20° C. to about 30° C. Other procedures involving immersion in ice-water mixes or ice per se can be utilized, but these procedures do not lend themselves to industrial applications.

Raw stuffed Homaridae lobster or Spiny lobster may be subjected either to freezing, or steam-cooked and cooled stuffed Homaridae lobster or Spiny lobster may be subjected to freezing conditions. In either case, the frozen Homaridae lobster or Spiny lobster may then be packaged in vacuum-sealable pouches under deep vacuum, in the range of about 25 inches to about 30 inches of Hg (block 3514 or block 3524). Optionally, prior to packaging, frozen stuffed and cooked Homaridae lobster or Spiny lobster can be bi-sectioned (block 3526), along the longitudinal axis by band-sawing and reconfigured as an intact product prior to vacuum packaging. In terms of the packaging material, optimum shelf-life results may be obtained through use of a heavy-duty shrinkable film laminate, e.g., the material sold by Cryovac (Canada). Moreover, the subsequent film-shrinking by heat exposure serves to minimize potential for breakage of appendages and body parts of the Homaridae lobster or Spiny lobster, which is a recognized problem due to the brittle shell characteristics of the Homaridae lobster or Spiny lobster.

With the above-described preparative methods of this embodiment of this invention, and with the equipment specifically-designed to support the procedures, up to about 400 units per hour of finished Homaridae lobster or Spiny lobster can be processed, which is commercially interesting and appealing.

The raw Spiny lobster meat, obtained according to the method of this aspect of the invention, has proven to offer excellent taste and texture characteristics, when served. The high-quality appearance of the Spiny lobster meat product is assured through definition of very white meat containing no visible intestinal content, nor hepatopancreatic visceral staining. A very attractive coral pink stuffing may be provided through the preparative method described. The stuffing containing Spiny lobster attains very intimate entrainment and interface to the internal shell contours and anterior abdominal facet of the tail meat. The overall appearance of such stuffed lobster is of a continuum of stuffing-blend and white tail meat. This embodiment of this invention serves to meet ever increasingly-stringent requirements by nations for minimum acceptable tolerance levels for certain heavy-metal components.

Yet other embodiments of this invention will now be described with reference to other hard-to-process species of crabs. While the method will be described for such hard-to-process crabs, it is equally applicable to crabs of any species, e.g., Snow crab, Maryland Blue crab, Alaska King crab, Dungeness crab, Northern Stone crab, Porcupine crab, Irish crab, Jonah crab, etc.

Crabs are decapod crustaceans (10-legged and having a crust or shell). Many species of crabs are abundant, grow large and have a high and nutritious meat yield from their body and legs. Such properties have made them a favourite food for humans.

FIGS. 6A, 6B, 6C and 6D show the Northern Stone crab (*Lithodes maja*). FIG. 6A shows the carapace 601, the legs 602 and the claws 603. It is noted that the Northern Stone crab is heavily armoured, and includes a plurality of sharp spines 604 on the carapace 601, on the legs 602 and on the claws 603. The abdomens or body 607, FIG. 6B and FIG. 6C show the ends 605 of the shoulder section 606 on the body 607 of the Northern Stone crab. FIG. 6D shows an overall view of the Northern Stone crab.

The distinguishing features of the *Lithodes maja* are that its integument is heavily calcified and spiny. This crab resembles snow crab in size and general shape but is identified by the numerous prominent spines on its carapace and legs. Its carapace is slightly longer than wide. It has a long spiny rostrum. Only 3 pairs of walking legs are apparent. In size, it is up to about 100 mm carapace width with a leg spread of about 600 mm and a weight of about 1.4 kg. *Lithodes maja* is unique for its pear-shaped shell which is covered with strong spines which are also found on its legs. It has five pairs of legs, the fifth pair being atrophied and hidden under the shell. It is long legged, orange-red in colour, and has numerous sharp spines on its carapace and legs. Its shell is hard and its meat is extremely sweet and delicious. Its claw is a strong claw with blunt teeth designed for cracking heavily-armoured prey.

The Northern Stone crab (*Lithodes maja*) is known to occur in the Atlantic Ocean from Newfoundland to the coast of New Jersey, and northwestern Europe, i.e., off the coasts of Greenland, Iceland, Spitzbergen, the British Isles, the Netherlands and Norway.

(d) Description of FIG. 7A, FIG. 7B, FIG. 7C and FIG. 7D

FIGS. 7A, 7B, 7C and 7D show the Porcupine crab (*Neolithodes grimaldii*). FIG. 7A shows the carapace 701, the legs 702 and the claws 703. It is noted that the Porcupine Crab is heavily armoured, and includes a plurality of sharp spines 704 on the carapace 701, the legs 702 and the claws 703. The abdomens, FIG. 7B and FIG. 6C show the ends 705 of the shoulder section 706 on the body 707 of the Porcupine Crab. FIG. 7D shows an overall view of the Porcupine crab.

The distinguishing features of *Neolithodes grimaldii* are that it is similar to the Northern Stone Crab, with long legs and is covered with very long spines, namely it has extremely prominent spines on its carapace and appendages. In size it reaches a maximum carapace width of about 100 mm, a leg spread of about 760 mm and a weight of about 1.4 Kg. Its rostrum a single strong spine with divergent spines at its base almost as long. Only its first legs chelate, the right leg being larger than the left. The fifth legs are hidden so it appears that only four pairs of legs are present. The abdomen under carapace has no plicopods in the males and the surface is not divided into plates. In females, the opposite is true, with plates arranged asymmetrically.

The range of distribution of the Porcupine Crab (*Neolithodes grimaldii*) is in the western Atlantic from Greenland to off the coast of North Carolina. In the eastern Atlantic it ranges from Iceland and the British Isles to the Azores and the Cape Verde Islands.

However, as distinct from the normal handling of crabs, e.g., Snow crab, Maryland Blue crab, Alaska King crab, Dungeness crab, Northern Stone crab, Porcupine crab, Irish crab, Jonah crab, etc., the handling of some species of crabs (to be described hereinafter) was difficult, either because of the long spines, and the labour-intensive processing for what was considered to be a small meat yield, or because of the size and difficulty of processing the legs, or because of the massive size of the claws and the strength of the shells. Utilization of traditional Snow crab or Dungeness crab processing procedures for such species of crabs was found to be inefficient. The roller which had heretofore been used for the removal of leg meat, and the brushes which had been used to remove the gills from sections did not work, since pieces of the spines and gills turned up in the meat. Major processing problem were encountered because of difficulties due to the sharp spines and in removing the gills. Accordingly, the present invention, in another feature, has provided a procedure for the processing of these species of crab, and a flow sheet of such method is shown in FIG. 8.

Figure 8:
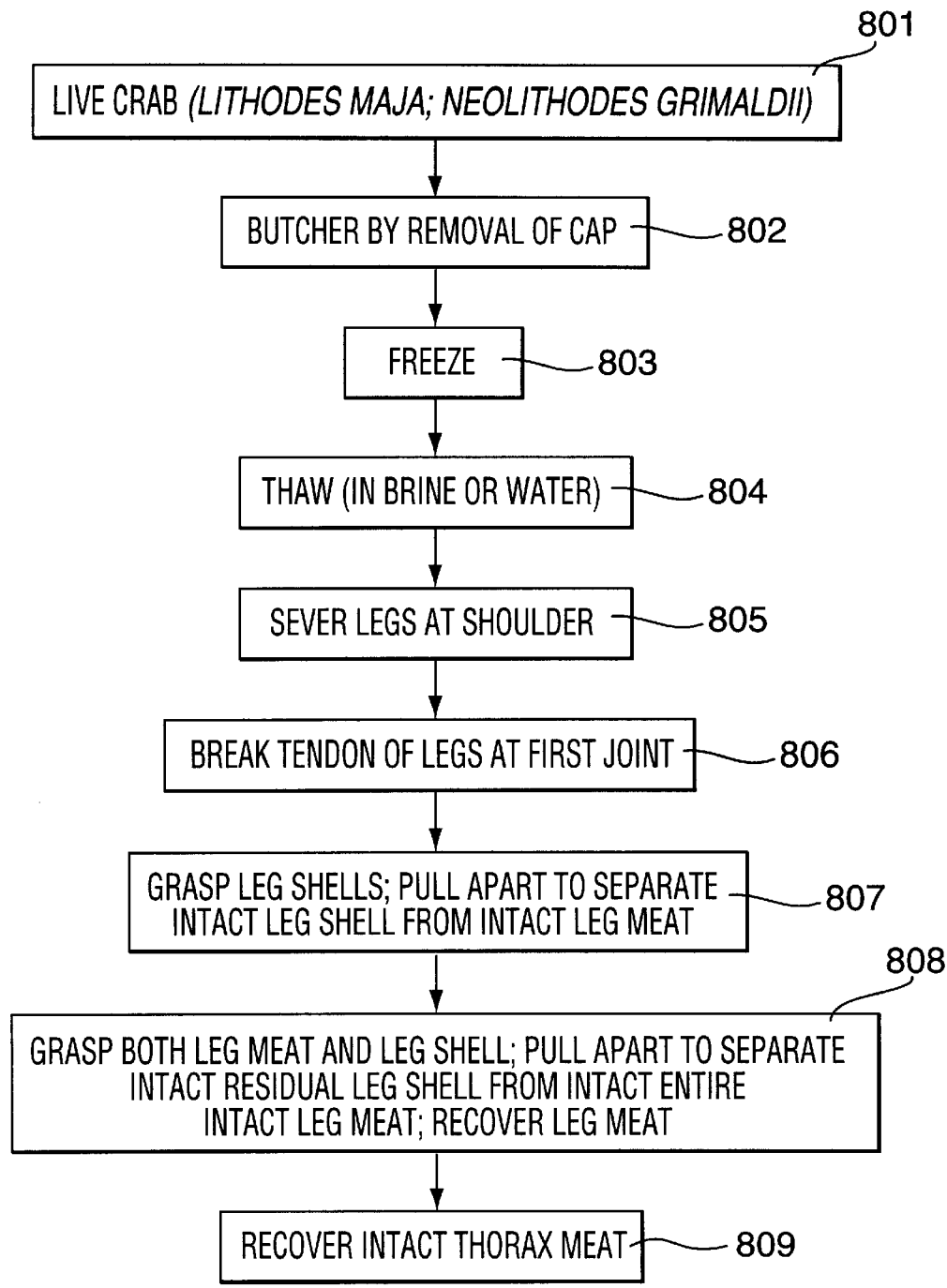
FIG. 8 is a flow chart of the steps carried out according to a method of yet another feature of this invention for the processing of the crabs which are shown in FIG. 6 and FIG. 7.

(e) Description of FIG. 8

FIG. 8 shows the steps in the processing of two species of crab. As is common with all species of crab, these two crab species generally comprise a body, claws and flippers and walking legs, including back fins. If the carapace is removed a central body ridge is exposed which extends along the back from the mouth to the stern within the visceral cavity. The body meat of the crab is within the two mounds on either side of the visceral cavity and the lump meats are formed within the mound cavities which are adjacent the stern of the crab body and adjacent and communicating with the back fins. Each of these lump meat cavities is bounded internally of the crab body by a bony wall which is concave on the side of the cavity, and the two walls are connected by a bony plate which bridges the visceral cavity.

The visceral cavity may be eviscerated by piercing the body, e.g., through the mouth and the mouth, stomach, and other portions of the gut substantially removed, by suction (known as vacuum evisceration).

The crab 801 is first butchered by the removal of the cap, which is the top of the head shell, (step 802). Then the capless crab is frozen at a temperature ranging from about −10° C. to about −20° C., (step 803). The capless crab is then thawed, either in water or in dilute brine, of about 2 to about 3% by weight of sodium chloride, until a temperature of 4° C. to 12° C. is reached, (step 804).

The legs are then manually severed from the capless crab at the shoulder, (step 805). The tendon at the first joint of the crab leg is cut. Then the intact leg shell is separated from the intact leg meat by the following steps:

To protect the human processor, for these species of crab, only the spines on the legs are broken by impact with a hammer, while retaining the shell intact. The intact shells of the two parts of the leg, namely the outer part, and the part adjacent to the shoulder are then grasped with different hands, and then pulled apart. The shell of the outer part of the leg separates from intact whole leg meat, and the intact shell is discarded. The intact whole leg meat and the shell of the part adjacent to the shoulder are grasped with different hands and pulled apart. The intact shell separates from the intact whole leg meat. The intact entire leg meat is recovered. These steps are collectively designated step 807 and step 808. The intact entire whole leg meat is recovered for use in any crab meat product.

Because the adherence of the head shell to the crab meat has been broken by the freeze-thaw cycle, the intact shell is easily manually removed from the intact crab meat. The intact crab meat is then recovered for use in any crab meat products, including possible use in a crab stuffing, as will be described hereinafter. These steps are designated step 809.

It may be possible to use the so-recovered crab meat to provide a crab stuffing. While the provision of such a crab stuffing using the crab meat which is recovered from these two species of crab is not shown by drawings, a generalized description thereof now follows:

Raw roe may be manually-extracted from the gravid female crab of any species, e.g., Snow crab, Maryland Blue crab, Alaska King crab, Dungeness crab, Northern Stone crab, Porcupine crab, Irish crab, Jonah crab, etc., including *Lithodes maja, Neolithodes grimaldii, Cancer pagurus* and *Cancer borealis*, and then may be subjected, either to chilling, or freezing under vacuum conditions. If frozen, the crab roe must be thawed prior to blending with the crab meat which has been extracted according to procedures described above. The crab roe and the crab meat fractions are blended together in a proportion ranging from between about 10% to about 50% for the crab roe, and correspondingly about 90% to about 50% for the crab meat. The stuffing may be made from the meat of crab of any species, e.g., Snow crab, and/or Maryland Blue crab, and/or Alaska King crab, and/or Dungeness crab, and/or Northern Stone crab, and/or Porcupine crab, and/or Irish crab, and/or Johah crab, and/or *Lithodes maja*, and/or *Neolighodes grimaldii*, and *Cancer pagurus* and/or *Cancer borealis*, and from the roe of crab of any species, e.g., Snow crab, and/or Maryland Blue crab, and/or Alaska King crab, and/or Dungeness crab, and/or Northern Stone Crab, and/or Porcupine crab, and/or Irish crab, and/or Jonah crab, and/or *Lithodes maja*, and/or *Neolighodes grimaldii*, and/or *Cancer pagurus* and/or *Cancer borealis*. The blending procedure is preferably achieved by use of a food processor, e.g., the one sold by Mari-tech Ltd. (Canada) until a creamy liquid consistency is achieved. During such processing, from about 90 g to about 990 g per kilogram of blend, and e.g., from about 10 g to about 10 g of an edible starch, e.g., the one sold by Nacan Products Limited (USA), may be added to the blend, to ensure its freeze-thaw stability. The crab roe and the crab meat extracted as described above is mixed with the starch. The weight ratio of the crab roe and the crab meat extracted as described above to the starch may vary from between about 5:5 to about 9:1, a desirable range being from about 6:4 to about 8:2.

The paste of the crab roe and the crab meat extracted as described above and starch mixture may be mixed under reduced pressure. Ordinarily, the mixing under reduced pressure may be accomplished by agitating in an agitator that can be sealed hermetically, and can provide inside an environment of reduced pressure. The degree of reduced pressure is e.g., about 0 mm to about 260 mm Hg. The mixture may be agitated rapidly at a reduced pressure near vacuum. The mixing may be successfully-accomplished under such reduced pressure, at about 260 mm of Hg pressure or less.

Examples of suitable agitators include a mixer, kneader, cutter, etc., which permit adequate agitation, e.g., one where all components of the mixture can be utilized at one time. For example, an agitator which may be used is one that is provided with a moving vane inside thereof, which rotates at the rate of about 40 rpm. The agitator may be provided with a cover in the upper part to be sealed hermetically, and is connected with a decompression device via a hose to keep the pressure of about 0 mm to about 260 mm Hg inside the agitator. At this point, the stuffing blend can either be frozen, preferably under vacuum, or be retained for further use.

The raw stuffing blend prepared from raw crab roe and raw crab meat components, as described above, from any species of crab, e.g., Snow crab, and/or Maryland Blue crab, and/or Alaska King crab, and/or Dungeness crab, and/or Northern Stone crab, and/or Porcupine crab, and/or Irish crab, and/or Johah crab, and/or *Lithodes maja*, and/or *Neolighodes grimaldii*, and *Cancer pagurus* and/or *Cancer borealis*, and from the roe of crab of any species, e.g., Snow crab, and/or Maryland Blue crab, and/or Alaska King crab, and/or Dungeness crab, and/or Northern Stone Crab, and/or Porcupine crab, and/or Irish crab, and/or Jonah crab, and/or *Lithodes maja*, and/or *Neolighodes grimaldii*, and/or *Cancer pagurus* and/or *Cancer borealis*, may be introduced into the eviscerated and back-flushed visceral cavity of a crab of any species, e.g., Snow crab, Maryland Blue crab, Alaska King crab, Dungeness crab, Northern Stone crab, Porcupine crab, Irish crab, Jonah crab, etc., via oral intubation. In this procedure, a metering pump can be utilized, e.g., the one sold by Mari-tech Ltd. (Canada). Dependent upon the size range of the crab, the amount of blend introduced in the visceral cavity will vary. By way of example, the principles of this embodiment of this invention can be applied to crabs of any species of varying size range, and most commonly weigh between about 250 g and about 1.5 kg. Such amounts required to fill the visceral cavity of crab amount to between about 10% and about 15% of the final weight of the crab. Following metered filling of the visceral cavity, the crab is subjected briefly to mechanical vibration, wherein the filled crab is maintained in a vertical position, with the visceral cavity facing uppermost and subjected to a gentle vibrating force. In this procedure, any residual air pockets entrained within the visceral cavity are voided and a complete fill of the cavity is ensured. The final product of this step is a raw stuffed crab, e.g., of any species of crab.

The raw stuffed crab of any crab species can either be frozen as is, for subsequent thawing and cooking, and then vacuum-packed with shrunk-film, or it can be subject to immediate cooking in atmospheric steam conditions of about 100° C. Advantageously, the raw stuffed crab may be placed ventral side uppermost into a process-dedicated steam chamber, e.g., the one sold for this purpose by Atlantic Systems Manufacturing Ltd. (Canada), with sufficient duration to achieve an internal temperature in the centre point of the stuffing blend of within the visceral cavity of between about 70° C. to about 85° C. This procedure may be generally-achieved in a time-frame of between about 15 minutes to about 20 minutes, and would serve to cook the crab and stuffed contents while still maintaining the crab meat sections in an optimal condition. Immediately following attainment of the desired internal temperature, of between about 75° C. to about 85° C., and to avoid post-cook drying of the delicate meat and stuffing blend, the cooked product should be cooled rapidly.

The optimal method of cooling the cooked stuffed crab of any crab species would be to subject the cooked stuffed crab to hydro-cooling by cold water spray irrigation, directed as a drench to the dorsal surface of crabs which are positioned with the dorsal surface uppermost. This may be accomplished through the use of a process-dedicated hydro-cooling device, e.g., the one sold by Atlantic Systems Manufacturing Ltd. (Canada). In such application, optimal results can be obtained through the use of either potable fresh water or sea water, in the temperature range of between about 1° C. and about 9° C., for a cooling period of between about 5 minutes and about 10 minutes, then effecting acceptable heat-reduction from within the centre of the lobster to between about 20° C. to about 30° C. Other procedures involving immersion in ice-water mixes or ice per se can be utilized, but these procedures do not lend themselves to industrial applications.

Raw stuffed crab of any species may be subjected either to freezing, or steamcooked and cooled stuffed crab may be subjected to freezing conditions. In either case, the frozen crab may then be packaged in vacuum-sealable pouches under deep vacuum, in the range of about 25 inches to about 30 inches of Hg. Optionally, prior to packaging, frozen stuffed and cooked crab can be bi-sectioned, along the longitudinal axis by band-sawing and reconfigured as an intact product prior to vacuum packaging. In terms of the packaging material, optimum shelf-life results may be obtained through use of a heavy-duty shrinkable film laminate, e.g., the material sold by Cryovac (Canada). Moreover, the subsequent film-shrinking by heat exposure serves to minimize potential for breakage of appendages and body parts of the crab.

With the above-described preparative methods of this embodiment of this invention, and with the equipment specifically-designed to support the procedures, up to about 400 units per hour of finished stuffed crab can be processed, which is commercially interesting and appealing. While the flow scheme of FIG. 8 specifically refers to the processing of *Lithodes maja* and *Neolithodes grimaldii*, it can be adapted for the processing of *Cancer pagurus* or *Cancer borealis*, or other species of crab, e.g., Snow crab, Maryland Blue crab, Alaska King crab, Dungeness crab, Northern Stone crab, Porcupine crab, Irish crab, Jonah crab, etc.

The crab meat obtained from crab species, e.g., Snow crab, Maryland Blue crab, Alaska King crab, Dungeness crab, Northern Stone crab, Porcupine crab, Irish crab, Jonah crab, etc., or from *Lithodes maja, Neolithodes grimaldii, Cancer pagurus* and *Cancer borealis*, according to the method of this feature of the invention, has proven to offer excellent taste and texture characteristics, when served. The stuffed crab may be served either in the intact form, or as bi-sectioned split halves. The product may be presented as either chill-thawed or re-warmed, as preferred by consumers. The high-quality appearance of the crab product is assured through definition of very white meat containing no visible intestinal content, nor hepatopancreatic visceral staining. A very attractive coral pink stuffing may be provided through the preparative method described. The stuffing attains very intimate entrainment and interface to the internal shell contours and anterior abdominal facet of the tail meat. The overall appearance of such stuffed crab is of a continuum of stuffing-blend and white tail meat. This embodiment of this invention serves to meet ever increasingly-stringent requirements by nations for minimum acceptable tolerance levels for certain heavy-metal components.

The above description of FIG. 8 has referred to two species of crab. These species of crab are described in FIGS. 9A and 9B.

Figure 9A:
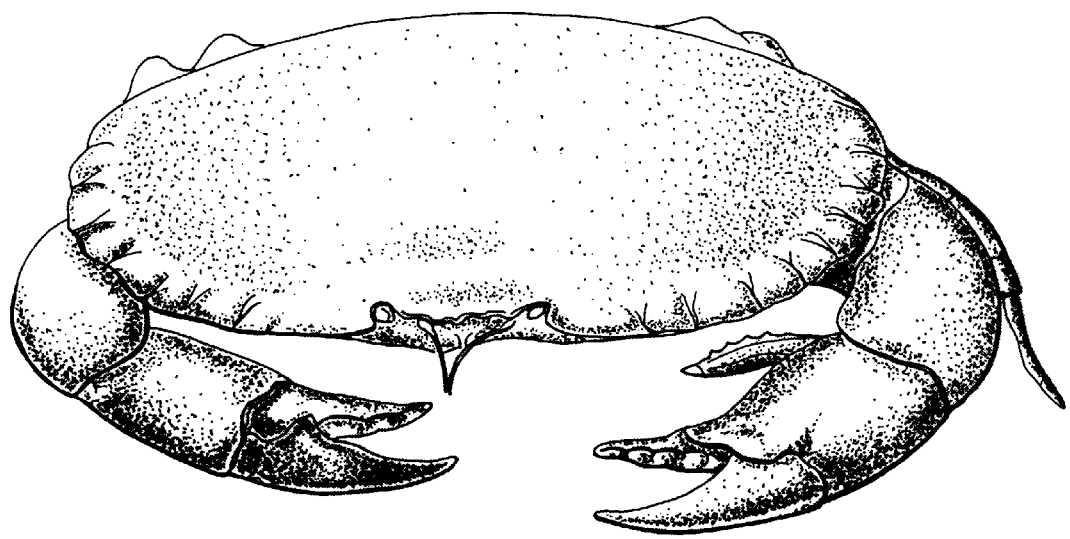
FIG. 9A is a photograph of the crab of the *Cancer pagurus* family, i.e., the Irish crab.
Figure 9B:
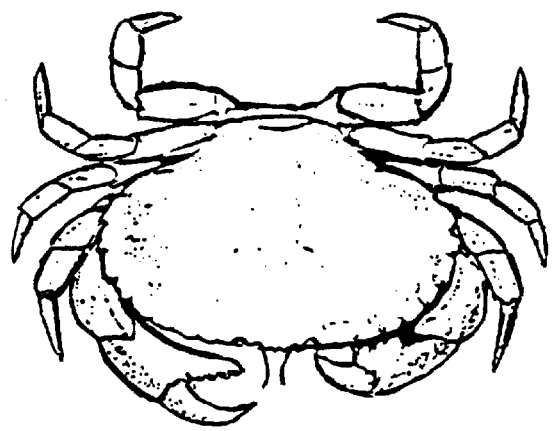
FIG. 9B is a view of the crab of the *Cancer borealis* family, i.e., the Jonah crab.

(f) Description of FIGS. 9A and 9B

FIG. 9A shows an overall view of a crab of the *Cancer pagurus* family, namely the Irish crab and FIG. 9B shows an overall view of a similar crab, i.e., a crab of the *Cancer borealis* family, namely the Jonah crab.

These crabs are similar to rock crab, but their carapace outline is more rounded, its legs relatively shorter but their claws are more massive than those of the rock crab. The claws are heavy claws which are able to exert slow but substantial forces which are ideal for crushing the shells of molluscs, sea urchins and crustaceans. There are nine, rectangular, rough-edged marginal teeth on each side of the front edge of the carapace. The surface of the claws and the carapace is rough. Their background colour is variable but is generally yellow-brown above and yellowish below. In size, they grow up to about 180 mm carapace width and about 0.4 kg in weight.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A method for removing raw edible crustacean meat from the intact shell of hard-shelled crustacean of any species in which said meat is very strongly adhered to said shell, said method comprising:
   a) initiating the detachment of said raw edible crustacean meat from said intact shell by the step of subjecting said intact shell to at least one freeze-thaw cycle, wherein said thawing is accomplished in cold water, or in a cold dilute solution of brine; and
   b) recovering said raw edible crustacean meat by the step of either:
      (i) subjecting the so-treated intact shell to vacuum aspiration to remove and recover said raw edible meat; or
      (ii) manually separating intact shell from intact raw edible crustacean meat, recovering said raw intact crustacean meat and discarding said shell.

2. A method as claimed in claim 1 for removing meat from the head-shell of Homaridae lobster which comprises:
   a) initiating the detachment of the raw edible deep-shoulder myotomal meat of said Homaridae lobster from the deep-shoulder cartilaginous skeletal attachment by the step of subjecting said head-shell to at least one freeze-thaw cycle wherein said thawing is accomplished with cold water, or with a cold dilute solution of brine; and
   b) subjecting the so-treated head-shell to vacuum aspiration to remove and recover the raw meat fraction.

3. A method as claimed in claim 1, for removing meat from Spiny lobster which comprises:
   a) initiating the detachment of an intact shell of said Spiny lobster from intact raw edible Spiny lobster meat by the step of subjecting said Spiny lobster to at least one freeze-thaw cycle, wherein said thawing is accomplished in cold water, or in a cold dilute solution of brine; and
   b) manually separating intact shell of said Spiny lobster from whole, intact Spiny lobster meat within said shell, recovering said whole, intact Spiny lobster meat, and discarding said shell.

4. The method as claimed in claim 3, including the steps of recovering intact whole antennae meat by:
   manually breaking the shell and the knuckles of the antennae;
   manually separating said broken shell from intact antennae meat; and
   recovering said intact antennae meat carapace while discarding said shell.

5. The method as claimed in claim 3, including the step of recovering intact, whole head shell meat by:
   separating intact head shell from intact head shell meat; and
   recovering said intact head shell meat while discarding said shell.

6. The method as claimed in claim 3, including the steps of recovering intact leg meat by:
   severing the legs from the body at the shoulder;
   severing the tendon of the legs at the first joint of the legs;
   grasping the shell of the leg at the extremity of the leg and at the shoulder end of the leg with different hands;
   pulling the shells apart, thereby exposing the intact leg meat adjacent to the extremity of the leg, and discarding that leg shell;
   grasping the exposed leg meat and the shell at the shoulder end of the leg with different hands;
   pulling the leg meat and the leg shell apart, thereby exposing the entire whole intact leg, and discarding the shell; and
   recovering the entire whole intact leg meat.

7. The method as claimed in claim 3, including the steps of recovering intact shoulder meat by:
   manually breaking the thorax shell at the shoulders of the legs into a plurality of segments;
   manually separating each broken thorax shoulder shell segment from the intact shoulder shell meat, and discarding the separated shell segments;
   manually breaking up the thorax shell into a plurality of segments;
   manually separating the broken-up thorax shell segments from the intact thorax meat and discarding the broken thorax shells; and
   recovering intact, whole thorax meat.

8. A method as claimed in claim 1, for removing meat from crab of any species which comprises:
   a) initiating the detachment of an intact shell of said crab from intact raw edible meat by the step of subjecting said crab to at least one freeze-thaw cycle wherein said thawing is accomplished with cold water, or with a cold dilute solution of brine; and
   b) manually separating intact shell of said crab from whole, intact crab meat within said shell, and recovering said whole, intact meat, while discarding said shell.

9. The method as claimed in claim 8, including the step of butchering said crab by removal of the cap.

10. The method as claimed in claim 8, including the steps of recovering intact crab leg meat by:
    severing the legs from the body of said crab at the shoulder;
    severing the tendon of the legs at the first joint of the legs;
    grasping the shell of the leg at the extremity of the leg and at the shell of the shoulder end of the leg with different hands;
    pulling the shells apart, thereby exposing the intact crab leg meat adjacent the extremity of the leg, and discarding that leg shell;
    grasping the exposed crab leg meat and the shell at the shoulder end of the leg with different hands;
    pulling the crab leg meat and the leg shell apart;
    thereby exposing the entire whole intact crab leg, and discarding the shell; and
    recovering the entire whole, intact crab leg meat.

11. The method as claimed in claim 8, including the steps of recovering intact whole thorax shoulder meat by:
    manually breaking the thorax shell at the shoulders of the legs into segments;
    manually separating each broken thorax shoulder shell segment from the intact shoulder shell meat, and discarding the separated shell segments;
    manually breaking up the thorax shell into segments;
    manually separating each broken-up thorax shell segment from the intact thorax meat and discarding the broken thorax shell segments; and
    recovering intact, whole thorax meat.

12. A method for preparing stuffed, intact, whole, Spiny lobster, which comprises:
    vacuum eviscerating the anterior and posterior sections of said lobster;

back-flushing said anterior and posterior sections of said lobster for the removal of the visceral and intestinal contents of said lobster; and filling said anterior visceral cavity of said lobster with a stuffing comprising a raw blend comprising roe of lobster of any species and lobster meat which has been recovered from a Spiny lobster;

thereby providing stuffed, intact, whole, lobster.

13. A stuffed, intact, whole, Spiny lobster in which the visceral and intestinal contents of said lobster have been removed, said lobster being filled with a stuffing comprising a raw blend comprising roe of lobster of any species and Spiny lobster meat.

14. A stuffed, intact, whole, Spiny lobster in which the visceral and intestinal contents of said lobster have been removed, said lobster being filled with a stuffing comprising a raw blend comprising roe of Spiny lobster and Spiny lobster meat.

15. A stuffing for a stuffed, intact, whole lobster in which the visceral and intestinal contents of said lobster have been removed, said stuffing comprising a raw blend comprising roe of lobster of any species and Spiny lobster meat.

16. A stuffing for a stuffed, intact, whole lobster in which the visceral and intestinal contents of said lobster have been removed, said stuffing comprising a raw blend comprising Spiny lobster roe and Spiny lobster meat.

17. A method for preparing stuffed, intact, whole, crab, of any species, which vacuum eviscerating the visceral cavity of said crab through the spot between the cap and the carapace of said crab;

back-flushing said visceral cavity of said crab for the removal of the visceral and intestinal contents of said crab; and filling said visceral cavity of said crab with a stuffing comprising a raw blend comprising roe of crab of any species, and meat of crab of any species;

thereby providing stuffed, intact, whole, crab.

18. A stuffed, intact, whole, crab of any species in which the visceral and intestinal contents of said crab have been removed, said crab being filled with a stuffing comprising a raw blend comprising roe of crab of any species and meat of crab of any species.

19. A stuffing for a stuffed, intact, whole crab in which the visceral and intestinal contents of said crab have been removed, said stuffing comprising a raw blend comprising roe of crab of any species and meat of crab of any species.

* * * * *

UNITED STATES PATENT AND TRADEMARK OFFICE
CERTIFICATE OF CORRECTION

PATENT NO. : 6,159,528
DATED : December 12, 2000
INVENTOR(S) : Cyril G. Gallant, Lily Hong and Richard Ablett It is certified that error appears in the above-identified patent and that said Letters Patent is hereby corrected as shown below:

<u>Title page,</u>
Item [56], References Cited, FOREIGN PATENT DOCUMENTS, delete "Switzerland" and insert therefor -- Japan --.

Signed and Sealed this

Second Day of August, 2005

JON W. DUDAS
*Director of the United States Patent and Trademark Office*